(12) United States Patent
Hotta

(10) Patent No.: US 12,251,662 B2
(45) Date of Patent: Mar. 18, 2025

(54) FORWARD OSMOSIS MEMBRANE, FORWARD OSMOSIS MEMBRANE MODULE, AND MANUFACTURING METHOD THEREOF

(71) Applicant: Asahi Kasei Kabushiki Kaisha, Tokyo (JP)

(72) Inventor: Daisuke Hotta, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 466 days.

(21) Appl. No.: 17/614,682

(22) PCT Filed: May 29, 2020

(86) PCT No.: PCT/JP2020/021437
§ 371 (c)(1),
(2) Date: Nov. 29, 2021

(87) PCT Pub. No.: WO2020/241860
PCT Pub. Date: Dec. 3, 2020

(65) Prior Publication Data
US 2022/0226778 A1    Jul. 21, 2022

(30) Foreign Application Priority Data
May 31, 2019 (JP) ................................. 2019-102652

(51) Int. Cl.
*B01D 61/00* (2006.01)
*B01D 63/04* (2006.01)
(Continued)

(52) U.S. Cl.
CPC ......... *B01D 61/002* (2013.01); *B01D 61/005* (2013.01); *B01D 63/04* (2013.01);
(Continued)

(58) Field of Classification Search
CPC ........ B01D 61/00; B01D 63/04; B01D 67/00; B01D 69/02; B01D 69/08; B01D 69/12; B01D 71/56
See application file for complete search history.

(56) References Cited

U.S. PATENT DOCUMENTS 10,583,404 B2 *   3/2020   Kiguchi ................. B01D 69/12
2012/0043274 A1   2/2012   Chi et al.
(Continued)

FOREIGN PATENT DOCUMENTS

CN    102773024 A        11/2012
CN    106902646 A  *    6/2017   ......... B01D 67/0079
(Continued)

OTHER PUBLICATIONS

Supplementary European Search Report issued in European Patent Application No. 20813249.8 dated Jul. 15, 2022.
(Continued)

*Primary Examiner* — Sharon Pregler
(74) *Attorney, Agent, or Firm* — Morgan, Lewis & Bockius LLP

(57) ABSTRACT

Provided are a forward osmosis membrane, a forward osmosis membrane module, and a manufacturing method thereof, wherein a forward osmosis membrane, which achieves an extremely favorable reduction in the reverse diffusion of salt compared to the prior art and has a predetermined water permeability, is developed thereby bringing about: practicality in that a liquid-like raw material solution used in actual concentration operations can be concentrated with suppressed diffusion of an induction solution even when used multiple times; and durability in that the performance of the membrane can be maintained within a predetermined range even when a raw material solution having an osmotic pressure is concentrated multiple times.

20 Claims, 1 Drawing Sheet

(51) Int. Cl.
  *B01D 67/00* (2006.01)
  *B01D 69/02* (2006.01)
  *B01D 69/08* (2006.01)
  *B01D 69/12* (2006.01)
  *B01D 71/56* (2006.01)

(52) U.S. Cl.
  CPC ..... *B01D 67/0006* (2013.01); *B01D 67/0088* (2013.01); *B01D 69/02* (2013.01); *B01D 69/08* (2013.01); *B01D 69/1251* (2022.08); *B01D 71/56* (2013.01); *B01D 2323/081* (2022.08); *B01D 2325/20* (2013.01)

(56) References Cited

U.S. PATENT DOCUMENTS

| | | |
|---|---|---|
| 2013/0020243 A1 | 1/2013 | Han et al. |
| 2013/0313185 A1 | 11/2013 | Chung et al. |
| 2014/0008291 A1 | 1/2014 | Tang et al. |
| 2015/0265976 A1 | 9/2015 | Shimizu et al. |
| 2017/0225131 A1 | 8/2017 | Morita et al. |
| 2017/0266625 A1 | 9/2017 | Kiguchi et al. |
| 2022/0226777 A1 | 7/2022 | Fujita et al. |

FOREIGN PATENT DOCUMENTS

| | | |
|---|---|---|
| JP | H04-187226 A | 7/1992 |
| JP | H107-114941 A | 5/1995 |
| JP | 3181134 B | 7/2001 |
| JP | 3665692 B | 6/2005 |
| JP | 3862184 B | 12/2006 |
| JP | 2013-022588 A | 2/2013 |
| JP | 2013-198893 A | 10/2013 |
| JP | 2016-155078 A | 9/2016 |
| JP | 2016-530078 A | 9/2016 |
| KR | 10-2013-0078827 A | 7/2013 |
| KR | 10-2014-0003294 A | 1/2014 |
| KR | 10-1453791 B1 | 10/2014 |
| WO | 99/22836 A2 | 5/1999 |
| WO | 2013/118859 A1 | 8/2013 |
| WO | 2015/000801 A1 | 1/2015 |
| WO | 2016/024573 A1 | 2/2016 |
| WO | 2016/027869 A1 | 2/2016 |
| WO | 2020/241865 A1 | 12/2020 |
| WO | 2021/016188 A2 | 1/2021 |

OTHER PUBLICATIONS

Sukitpaneenit et al., "High Performance Thin-Film Composite Forward Osmosis Hollow Fiber Membranes with Macrovoid-Free and Highly Porous Structure for Sustainable Water Production," Environmental Science & Technology, 46 (13): 7358-7365 (2012).
Yip et al., "High Performance Thin-Film Composite Forward Osmosis Membrane," Environmental Science & Technology, 44: 3812-3818 (2010).
Chou et al., "Characteristics and Potential Applications of a Novel Forward Osmosis Hollow Fiber Membrane," Desalination, 261: 365-3721 (2010).
International Search Report issued in corresponding International Patent Application No. PCT/JP2020/021437 dated Jul. 14, 2020.
International Preliminary Report on Patentability and Written Opinion issued in corresponding International Patent Application No. PCT/JP2020/021437 dated Dec. 9, 2021.

* cited by examiner

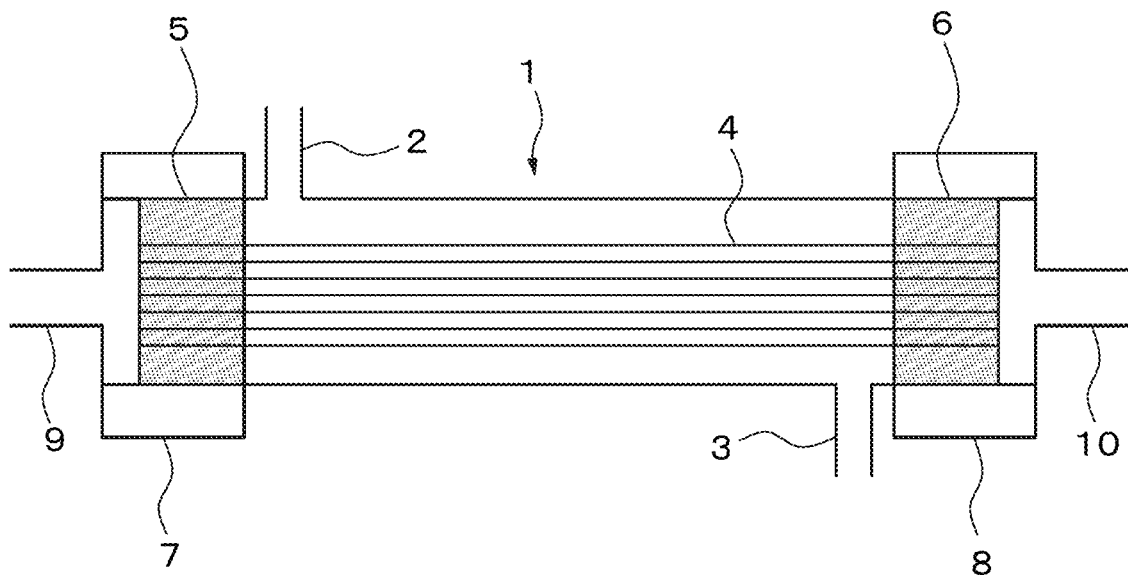

FORWARD OSMOSIS MEMBRANE, FORWARD OSMOSIS MEMBRANE MODULE, AND MANUFACTURING METHOD THEREOF

FIELD

The present invention relates to a forward osmosis membrane for separating a solvent from a target liquid mixture and concentrating the target, as well as a forward osmosis membrane module comprising the same and a manufacturing method thereof. More specifically, the present invention relates to a forward osmosis membrane which is particularly suitable for the high-concentration concentration of a raw material liquid by realizing excellent reduction of a salt reverse diffusion amount and having a water permeation performance equal to or greater than a predetermined level, as well as a forward osmosis membrane module comprising the same and a manufacturing method thereof.

BACKGROUND

The forward osmosis method is known as a method for concentration a raw material liquid.

The forward osmosis method is a method of transferring a solvent from a raw material liquid to a draw solution by adjoining a raw material liquid and a draw solution having a higher osmotic pressure than the raw material liquid via a forward osmosis membrane. The driving force of the forward osmosis method is the osmotic pressure difference between the raw material liquid and the draw solution. Thus, unlike the distillation method or the reverse osmosis method, which are existing concentration techniques, it is expected that the raw material liquid can be concentrated without requiring heating or high pressure and without the loss of valuable components in the raw material liquid.

The forward osmosis method is similar to the reverse osmosis method in that a semipermeable membrane is used to allow the solvent to permeate preferentially over the solute. However, in the forward osmosis method, the solvent is permeated from the diluted solution (raw material liquid) side to the concentrated solution (draw solution) side using the osmotic pressure difference, and in this respect, it differs from the reverse osmosis method in which water is permeated from the concentrated solution side to the diluted solution side by pressurizing the concentrated solution side against the osmotic pressure difference.

Thus, even if a reverse osmosis membrane designed to exhibit high water permeability under pressure is applied to the forward osmosis method as-is, as described in, for example, Non-Patent Literature 1, such a membrane is not always suitable for the forward osmosis method.

Membranes suitable for the forward osmosis method are designed such that the permeability of the solvent (water permeability) from the raw material liquid to the draw solution is large and the diffusion of the components in the draw solution into the raw material liquid (salt reverse diffusion) is small. However, in general, it is not easy to realize high water permeability and low salt reverse diffusion, and there is an antinomy that if one of them is improved, the other will be sacrificed.

In connection with such a problem, in Patent Literature 1, a forward osmosis membrane having high water permeability and a low reverse diffusion amount is obtained by establishing means for forming a separation active layer by the interfacial polymerization method on the surface in a hollow fiber membrane of the hollow fiber membrane module assembled in advance, and forming a uniform separation active layer.

Furthermore, in Patent Literature 2 and 3, by forming a separation active layer on the surface of a support membrane having a structure having a high porosity, the diffusibility of the solute inside the support membrane is increased, whereby a forward osmosis membrane having suitable water permeability is obtained.

In Non-Patent Literature 2, various forward osmosis membranes are comparatively evaluated, and among them, forward osmosis membranes having a separation active layer on the inner surface of the hollow fibers has high water permeability.

As a method for improving the separation performance of a semipermeable membrane, Patent Literature 4 proposes a method for improving organic matter removal rate by treating a composite reverse osmosis membrane with hot water.

Furthermore, Patent Literature 5 and 6 propose methods for improving both organic matter removability and water permeability by treating a composite reverse osmosis membrane with hot water in which trialkylamine is dissolved, and Patent Literature 7 proposes a method of treating a membrane with hypochlorite after hot water treatment.

Patent Literature 8 proposes a reverse osmosis membrane having high performance at low pressure by a method of subjecting a semipermeable membrane produced by devising a solution to a dryer at 100° C. or higher.

CITATION LIST

Patent Literature

[PTL 1] WO 2016/027869
[PTL 2] US Patent Application Publication No. 2013/0313185
[PTL 3] Japanese Unexamined Patent Publication (Kokai) No. 2016-155078
[PTL 4] Japanese Examined Patent Publication (Kokoku) No. 07-114941
[PTL 5] Japanese Patent No. 3665692
[PTL 6] Japanese Patent No. 3862184
[PTL 7] WO 99/22836
[PTL 8] Japanese Patent No. 3181134

Non Patent Literature

[NPL 1] N. Y. Yip, A. Tiraferri, W. A. Phillip, J. D. Schiffman, and M. Elimelech, "High Performance Thin-Film Composite Forward Osmosis Membrane", Environ. Sci. Technol., 44, pp. 3812-3818 (2010)
[NPL 2] S. Chou, L. Shi, R. Wang, C. Y. Tang, C. Qiu and A. G. Fane, "Characteristics and Potential Applications of a Novel Forward Osmosis Hollow Fiber Membrane", Desalination, 261, pp. 365-372 (2010)

SUMMARY

Technical Problem

However, the methods described in Patent Literature 1 and Non-Patent Literature 2 are not yet sufficient in reducing the salt reverse diffusion amount, and there is room for improvement of the forward osmosis membrane itself.

Furthermore, the methods described in Patent Literature 2 and 3 have a drawback that though the water permeability is high, the salt reverse diffusion amount is also high. When considering the actual concentration treatment, a plurality of components are often mixed in the raw material liquid to be concentrated, and the solute is often present at a high concentration in both of them via the forward osmosis membrane. In particular, in the high-concentration concentration of a raw material liquid, it is necessary to reduce the salt reverse diffusion while moving the solvent from the raw material liquid, which has a very high solute concentration, and in this case, the preferable performance as a forward osmosis membrane is considered to be a certain degree of water permeability and a low salt reverse diffusion amount rather than a high water permeability. However, as can be seen in the above literature, the development of forward osmosis membranes often emphasizes high water permeation property, and in this respect, there is much room for improvement in forward osmosis membranes.

In the method described in Patent Literature 4, there is a problem in that the water permeability of the treated membrane is significantly reduced. Furthermore, in the methods described in Patent Literature 5 to 7, the treated membrane is not washed sufficiently, and the elution of membrane residue becomes problematic in actual use. Regarding the method described in Patent Literature 8, the semipermeable membrane is generally hydrophilic, and when it becomes dry, the flexibility or strength of the semipermeable membrane is lost, and recovery takes time or requires a hydrophilic agent.

Further, the methods described above were developed for a flat membrane-type reverse osmosis membranes, and it is difficult to obtain high performance even if the reverse osmosis membrane produced by the above method is used for forward osmosis treatment. All of the above methods treat the membrane with the separation active layer exposed, whereby the separation active layer is easily physically damaged, which is also a problem in modularization, which is commonly required in actual use of the membrane.

Thus, an object of an aspect of the present invention is to provide a forward osmosis membrane as well as a forward osmosis membrane module and a manufacturing method thereof which, in the concentration of the raw material liquid having a liquid characteristic close to that of the raw material liquid used in the actual concentration operation, i.e., having an osmotic pressure: are practical because concentration with suppressed diffusion of the draw solution can be carried out even in multiple times usage; and has durability to maintain membrane performance within a predetermined range even if the raw material liquid having osmotic pressure is concentrated multiple times, by developing a forward osmosis membrane: wherein extremely excellent reduction of the salt reverse diffusion as compared to the prior art is achieved; and having a certain degree of water permeability, when testing performance in the case in which water is used as the raw material liquid and a sodium chloride aqueous solution is used as the draw solution, which is one of the performance indexes of a general forward osmosis membrane.

Solution to Problem

The present inventors did not focus on for high water permeability, which was the development guideline for many conventional forward osmosis membranes, but pursued low salt reverse diffusion at the expense of a certain degree of water permeability, and developed a practical forward osmosis membrane by a development guideline that has never existed before, focusing on the possibility that setting an appropriate range of both performances affects the behavior of actual enrichment operation and the durability of the forward osmosis membrane.

Specifically, examples of modes for carrying out the present invention are as shown below.

<<Aspect 1>>

A forward osmosis membrane in which a separation active layer of a polymer is provided on a surface of a microporous support membrane, wherein
when purified water is arranged as a raw material liquid on the separation active layer side and 3.5% by mass of a sodium chloride aqueous solution is arranged as a draw solution on the microporous support membrane side via the forward osmosis membrane, a salt reverse diffusion amount R1 into the raw material liquid is 0.65 g/(m$^2$×hr) or less, and a water permeability F1 into the draw solution is 3.5 kg/(m$^2$×hr) or more.

<<Aspect 2>>

The forward osmosis membrane according to Aspect 1, wherein the salt reverse diffusion amount R1 into the raw material liquid is 0.45 g/(m$^2$×hr) or less.

<<Aspect 3>>

The forward osmosis membrane according to Aspect 1 or 2, wherein the salt reverse diffusion amount R1 into the raw material liquid is 0.30 g/(m$^2$×hr) or less.

<<Aspect 4>>

The forward osmosis membrane according to any one of Aspects 1 to 3, wherein the water permeability F1 into the draw solution is 5.0 kg/(m$^2$×hr) or more.

<<Aspect 5>>

The forward osmosis membrane according to any one of Aspects 1 to 4, wherein the water permeability F1 into the draw solution is 6.5 kg/(m$^2$×hr) or more.

<<Aspect 6>>

The forward osmosis membrane according to any one of Aspects 1 to 5, wherein the salt reverse diffusion amount R1 into the raw material liquid is 0.01 g/(m$^2$×hr) or more.

<<Aspect 7>>

The forward osmosis membrane according to any one of Aspects 1 to 6, wherein the water permeability F1 into the draw solution is 50 kg/(m$^2$×hr) or less.

<<Aspect 8>>

The forward osmosis membrane according to any one of Aspects 1 to 7, wherein the microporous support membrane comprises a membrane having, as primary components, at least one selected from the group consisting of polyethersulfone, polysulfone, polyketone, polyetheretherketone, polyphenylene ether, polyvinylidene fluoride, polyacrylonitrile, polyimine, polyimide, polybenzoxazole, polybenzimidazole, and polyamide.

<<Aspect 9>>

The forward osmosis membrane according to Aspect 8, wherein the microporous support membrane is a membrane comprising, as primary components, at least one selected from the group consisting of polyethersulfone, polysulfone, polyketone, and polybenzimidazole.

<<Aspect 10>>

The forward osmosis membrane according to Aspect 9, wherein the microporous support membrane is a membrane comprising, as primary components, at least one selected from the group consisting of polyethersulfone and polysulfone.

<<Aspect 11>>

The forward osmosis membrane according to any one of Aspects 8 to 10, wherein the water permeability F1 into the draw solution is 5.0 kg/(m$^2$×hr) or more.

<<Aspect 12>>

The forward osmosis membrane according to any one of Aspects 8 to 11, wherein the salt reverse diffusion amount R1 into the raw material liquid is 0.45 g/(m²×hr) or less.
<<Aspect 13>>
The forward osmosis membrane according to any one of Aspects 1 to 12, wherein the polymer is a polycondensation product of one or more first monomers selected from the group consisting of polyfunctional amines and one or more second monomers selected from the group consisting of polyfunctional acid halides.
<<Aspect 14>>
The forward osmosis membrane according to Aspect 13, wherein the polymer is a polyamide.
<<Aspect 15>>
The forward osmosis membrane according to any one of Aspects 1 to 14, wherein the forward osmosis membrane is a hollow fiber.
<<Aspect 16>>
The forward osmosis membrane according to Aspect 15, wherein the separation active layer is present on an inner surface of the microporous support membrane.
<<Aspect 17>>
A forward osmosis membrane module in which the forward osmosis membrane according to any one of Aspects 1 to 16 is incorporated.
<<Aspect 18>>
The forward osmosis membrane module according to Aspect 17, wherein the forward osmosis membrane is a hollow fiber and the forward osmosis membrane module comprises a hollow-fiber fiber bundle constituted by a plurality of the hollow fibers.
<<Aspect 19>>
The forward osmosis membrane module according to Aspect 18, wherein in a scanning electron microscope image in which a thickness direction cross-section of the separation active layer is captured, an average thickness coefficient of variation of the separation active layer in the radial direction and longitudinal direction of the hollow-fiber fiber bundle is 0 to 60%.
<<Aspect 20>>
A method of producing the forward osmosis membrane module according to Aspect 18 or 19, comprising:
a separation active layer formation step wherein a separation active layer is provided on an inner surface of a microporous support membrane, and
a heat-treatment step wherein, after the separation active layer formation step, a fluid of 55° C. or higher is supplied to at least the inner surface side of the hollow fibers in a fluid state and a wet state.
<<Aspect 21>>
The method of producing a forward osmosis membrane module according to Aspect 20, wherein the heat treatment step is performed by continuously supplying 70° C. to 95° C. hot water to at least the inner surface side of the hollow fibers.
<<Aspect 22>>
The method of producing a forward osmosis membrane module according to Aspect 20, wherein the heat-treatment step is performed by means of 100° C. to 150° C. water vapor.

Advantageous Effects of Invention

The forward osmosis membrane according to one aspect of the present invention has extremely low salt reverse diffusion and has a water permeability equal to or greater than a predetermined level, whereby practicality such that it is possible to concentrate with suppressed diffusion of the draw solution even when used multiple times and durability such that membrane performance can be maintained within a predetermined range even if a raw material liquid having osmotic pressure is concentrated multiple times can be combined.

BRIEF DESCRIPTION OF DRAWINGS

FIG. 1 is a cross-sectional schematic view of one aspect of a forward osmosis membrane module.

DESCRIPTION OF EMBODIMENTS

An embodiment (hereinafter referred to as "the present embodiment") of the present invention will be described in detail as a non-limiting example.

The present embodiment can suitably be applied to, for example, the concentration of liquid foods or pharmaceutical solutions. By using the forward osmosis membrane of the present embodiment, the object to be concentrated can be concentrated at a high magnification without heating, and non-heated high-concentration concentration, which prevents deterioration of components or contamination of foreign substances while highly suppressing the outflow or inflow of solutes, is possible. Furthermore, in addition to applications such as dehydration, the present embodiment can suitably be applied to seawater desalination, brackish water desalination, treatment of accompanying water discharged from gas fields such as shale gas or oil fields, concentration of fertilizer solution, or dilution using the desired concentrate as a draw solution.

The forward osmosis membrane of the present embodiment is composed of a separation active layer composed of a semipermeable membrane which allows the permeation of only specific substances, and a microporous support membrane which physically supports the separation active layer on the surface of the microporous support membrane, and more specifically, on the inner or outer surface thereof.

The water permeability F1 and salt reverse diffusion amount R1 of the forward osmosis membrane of the present embodiment are evaluated by performing a forward osmosis treatment on each solution under the condition of 25° C. using purified water as the raw material liquid, and using 3.5% by mass sodium chloride aqueous solution as the draw solution.

Furthermore, the salt reverse diffusion amount R2, the water permeability F2, and the salt permeability R2/F2 calculated by dividing R2 by F2 of the forward osmosis membrane of the present embodiment are evaluated by performing a forward osmosis treatment on each solution under the condition of 25° C. using a raw material liquid (for example, a raw material liquid containing a solute (for example, a 20% by mass sodium chloride aqueous solution)) and a draw solution (for example, a 35% by mass magnesium chloride aqueous solution) having a higher osmotic pressure than the raw material liquid.

These evaluations are each performed five times, and the average values thereof are evaluated.

Furthermore, when a forward osmosis membrane having a support membrane and a separation active layer arranged on one side of the support membrane is used, the water permeability F may differ significantly depending on whether the raw material liquid is located on the separation active layer side or the support membrane side. In the present embodiment, in an actual concentration environment, the raw material liquid can be arranged and evaluated on the separation active layer side, where the risk of membrane contamination is smaller. Generally, in this case, the water permeability is often lower than that when the raw material liquid is arranged on the support membrane side.

The salt reverse diffusion amount R of the forward osmosis membrane (which can be R1 or R2, hence R1 and R2 are collectively referred to as R) means the amount of solute which moves from draw solution into raw material liquid when the raw material liquid to be concentrated is arranged on the separation active layer side, the draw solution, which has a higher osmotic pressure, is arranged on the support membrane side, and the forward osmosis membrane is interposed therebetween. The salt reverse diffusion amount R is defined by formula (1) below.

$$R = G/(M \times H) \quad (1)$$

In formula 1, G is the amount of permeated solute (g), M is the effective surface area of the forward osmosis membrane ($m^2$), and H is the time (hr).

The separation active layer is basically arranged on the surface of the support membrane, and considering a concept of a front and a back, it is preferably arranged on one thereof, but may be present on both sides. The separation active layer may have a symmetrical structure or an asymmetric structure with respect to the microporous support membrane. Furthermore, when a separation active layer is present on both sides of the support membrane, the separation active layers on both sides may be continuous or discontinuous via the microporous support membrane. When a separation active layer is arranged on both sides of the support membrane, the separation active layer side of the present disclosure means the layer side within the entirety of the forward osmosis membrane that is considered to better block the solute of the draw solution. As a method for evaluating the side that better blocks the solute of draw solution, for example, in the case in which purified water is arranged as the raw material liquid on one side and 3.5% by mass of a sodium chloride aqueous solution is arranged as the draw solution on the other side via a forward osmosis membrane, or in the case in which the arrangement of these solutions is reversed, when the above salt reverse diffusion amount R1 to the raw material liquid is evaluated and these two evaluation systems are compared, in the evaluation system in which R1 becomes smaller, the raw material liquid side is determined as the side that better blocks the solute of draw solution (the separation active layer side).

The salt reverse diffusion amount R1 (salt reverse diffusion) of the forward osmosis membrane of the present embodiment is extremely low, and it is preferable that it be as low as possible. If the salt reverse diffusion amount is excessively large, problems such as solute in the draw solution mixing in the raw material liquid, the solute in the raw material liquid mixing in the draw solution, the purity of the raw material liquid concentrate decreasing, leading to a loss of component balance, contamination of the draw solution, and loss of the components in the draw solution over time occur.

Furthermore, though the reason is not clear, if the salt reverse diffusion amount R1 exceeds 1.2 g/($m^2 \times$hr), which was conventionally considered to be sufficiently low, the salt reverse diffusion amount R2 increases remarkably, and as a result, the salt permeability R2/F2 tends to increase. From the viewpoint of avoiding these problems, the salt reverse diffusion amount R1 of the forward osmosis membrane of the present embodiment is, in one aspect, 0.65 g/($m^2 \times$hr) or less, and is preferably 0.45 g/($m^2 \times$hr) or less, and more preferably 0.30 g/($m^2 \times$hr) or less.

The salt reverse diffusion amount R1 of the forward osmosis membrane of the present embodiment may be 0.01 g/($m^2 \times$hr) or more.

The water permeability F of the forward osmosis membrane (which can be F1 or F2, hence F1 and F2 are collectively referred to as F) means the amount of water which moves from the raw material liquid to the draw solution when the raw material liquid to be concentrated is arranged on the separation active layer side, the draw solution, which has a higher osmotic pressure, is arranged on the support membrane side, and the forward osmosis membrane is interposed therebetween. The water permeability F of the forward osmosis membrane is defined by the following formula (2).

$$F = L/(M \times H) \quad (2)$$

In formula 2, L is the amount of permeated water (kg), M is the effective surface area of the forward osmosis membrane ($m^2$), and H is the time (hr).

The higher the water permeability F1 (water permeation property or water permeation performance) of the forward osmosis membrane of the present embodiment, the more preferable, but in one aspect, it is 3.5 kg/($m^2 \times$hr) or more, which is practical from the viewpoint of concentration of the raw material liquid and from the viewpoint of achieving highly efficient solvent transfer. From the same viewpoints, the water permeability F1 is preferably 5.0 kg/($m^2 \times$hr) or more, more preferably 6.0 kg/($m^2 \times$hr) or more, and particularly preferably 6.5 kg/($m^2 \times$hr) or more. Though the reason is not clear, for example, when the water permeability F1 is less than 3.5 kg/($m^2 \times$hr), as a result of using the reverse osmosis membrane as a forward osmosis membrane, the water permeability F2 is remarkably low, the influence of salt reverse diffusion amount R2 is relatively large, and salt permeability R2/F2 is large, which is not practical as forward osmosis membrane. Conversely, when the water permeability is particularly large, the salt reverse diffusion is also large in many cases, and thus, the water permeability F1 is preferably 50 kg/($m^2 \times$hr) or less.

The salt permeability R1/F1 obtained by dividing the salt reverse diffusion amount R1 of the present embodiment by the water permeability F1 is an index indicating the selectivity of solvent permeation and salt permeation. The lower the value thereof, the more difficult it is for the salt to permeate and the easier it is for the solvent to permeate, which is preferable. However, in conventional general forward osmosis membranes, when the salt reverse diffusion amount is low, permeability is often significantly low, and as a result, the value of R1/F1 is often high. In the forward osmosis membrane of the present embodiment, the value of R1/F is preferably 0.08 or less, more preferably 0.06 or less, further preferably 0.04 or less, and particularly preferably 0.03 or less, which is practical from the viewpoint of concentration of the raw material liquid and from the viewpoint of achieving highly efficient solvent transfer. The value of R1/F1 is ideally 0, but from the viewpoint of ease of production of the forward osmosis membrane, it may be, for example, 0.0001 or more.

In an initial stage, by setting the water permeability F1 to 3.5 kg/($m^2 \times$hr) or more and R1 to 0.65 g/($m^2 \times$hr) or less, in, for example, the concentration of a raw material liquid having osmotic pressure, the forward osmosis membrane of the present embodiment is highly practical since concentration can be performed thereby while suppressing the diffusion of the draw solution even after multiple uses of the membrane.

Furthermore, from the comparison of the membrane performance R1/F1 between the initial stage and after the concentration operation, the forward osmosis membrane of the present embodiment can maintain membrane performance within a desired range even when used multiple times, and has high durability.

Though the reason is not clear, this is considered because, in the forward osmosis membrane of the present embodiment, since the balance between the initial water permeability F1 and the salt reverse diffusion amount R1 is suitable, the carrying of substances such as draw solutes in the separation active layer is unlikely to occur, and the osmotic pressure in the separation active layer is unlikely to increase, whereby the sudden invasion of water exceeding the amount of water originally contained by the separation active layer into the inside of the separation active layer is suppressed, and as a result, the higher-order structure of the separation active layer is not destroyed. The molecular structure of the separation active layer and the higher-order structure represented by hydrogen bonds and interactions between aromatic rings are considered to have a strong influence on the permeability of water and salts. Once the higher-order structure is destroyed, it is considered that substances such as draw solutes invade the inside of the separation active layer and are easily carried thereon. Such invasion can cause a chain of destruction of the separation active layer by increasing the osmotic pressure in the separation active layer. As a result, the performance of the forward osmosis membrane is considered to decrease to a certain value.

In the present embodiment, since the water permeability F1 is equal to or higher than a predetermined value and the salt reverse diffusion amount R1, which is a salt permeability index, is low, the carrying of salt in the separation active layer is suppressed for long periods of time by, for example, washing. From the foregoing, it is considered that the forward osmosis membrane of the present embodiment can have not only practicality but also durability. It should be noted that the embodiment is not bound by the above considerations.

The salt permeability R2/F2 obtained by dividing the salt reverse diffusion amount R2 of the present embodiment by the water permeability F2 is an index indicating selectivity closer to the actual concentrated environment in that the raw material liquid has an osmotic pressure, and the lower the value, the more difficult it is for the salt to permeate and the easier it is for the solvent to permeate, which is preferable. Though the reason is not clear, salt permeability often decreases when solutes are present on both sides of the forward osmosis membrane, likely due to the effects of ion exchange. In particular, as described above, when the salt reverse diffusion amount R1 exceeds 1.2 $g/(m^2 \times hr)$, which is a value which was conventionally considered to be sufficiently low, the salt reverse diffusion amount R2 increases significantly. Thus, the water permeability F2 is unlikely to increase, and as a result, R2/F2 tends to increase. In the use of the forward osmosis membrane of the present embodiment, the values of R2, F2, and R2/F2 may be in the ranges exemplified as the values of R1, F1, and R1/F1, respectively.

The draw solution is a solution which exhibits a higher osmotic pressure than the raw material liquid containing a substance to be separated or concentrated, and has a function of transferring the solvent from the raw material liquid via the forward osmosis membrane.

The draw solution expresses a high osmotic pressure as a result of the including of the draw solute at a high concentration.

Examples of the draw solute include alkali metal salts, alkaline earth metal salts, ammonium salts, sugars, monoalcohols, glycols, and water-soluble polymers. Specific examples thereof include:

as alkali metal salts, sodium chloride, potassium chloride, sodium sulfate, sodium thiosulfate, and sodium sulfite;

as alkaline earth metal salts, magnesium chloride, calcium chloride, and magnesium sulfate; as ammonium salts, ammonium chloride, ammonium sulfate, and ammonium carbonate;

as sugars, in addition to simple sugars such as sucrose, fructose, and glucose, complex sugars such as oligosaccharides and rare sugars;

as monoalcohols, methanol, ethanol, 1-propanol, and 2-propanol;

as glycols, ethylene glycol and propylene glycol; and as water-soluble polymers, polyethylene oxide and polypropylene oxide, as well as copolymers of ethylene oxide and propylene oxide.

The microporous support membrane (sometimes referred to simply as "support membrane" in the present disclosure) of the present embodiment is a membrane for supporting a separation active layer of a polymer (typically, a polymer thin film), and it is preferable that the membrane itself not substantially exhibit separation performance with respect to the object to be separated. As the microporous support membrane, any microporous support membrane including known microporous support membranes can be used. The microporous support membrane of the present embodiment preferably has micropores having a pore size of 0.001 µm to 0.1 µm, more preferably 0.005 µm to 0.05 µm, on the surface thereof. The structure of the microporous support membrane other than the surface is preferably as sparse as possible as long as the strength thereof is maintained in order to reduce the permeation resistance of the permeating fluid. The sparse structure of this portion is preferably, for example, a reticular structure, finger-like voids, or a mixed structure thereof.

This microporous support membrane is particularly preferably composed of hollow fibers because a large surface area per module of the forward osmosis membrane module can be obtained.

When a predetermined pressure is applied to the microporous support membrane of the present embodiment, the water permeability of the support membrane, expressed as the amount of purified water which permeates a given membrane area over a given time, is preferably 100 $kg/(m^2 \times hr)/100$ kPa or more, and more preferably 200 $kg/(m^2 \times hr)/100$ kPa or more. When the water permeability of the support membrane is excessively low, the water permeability F of the resulting forward osmosis membrane module tends to be low. It is preferable that the water permeability of the support membrane be large as long as the mechanical strength of the support membrane is not impaired thereby. Generally, the higher the water permeability, the lower the mechanical strength. Thus, the water permeability of the microporous support membrane of the present embodiment is preferably 50,000 $kg/(m^2 \times hr)/100$ kPa or less, and more preferably 10,000 $kg/(m^2 \times hr)/100$ kPa or less.

As the material of the microporous support membrane, any material which can be formed on the microporous support membrane can be used. However, when producing the forward osmosis membrane of the present embodiment, it is necessary that the membrane not be chemically damaged by the monomer solution used. Further, in the present embodiment, materials which can be molded into microporous hollow fibers are preferable. Thus, from the viewpoints of chemical resistance, film formation, and durability, as the material of the microporous support membrane, at least one selected from the group consisting of, as primary components, polyethersulfone, polysulfone, polyketone, polyetheretherketone, polyphenylene ether, polyvinylidene fluoride, polyacrylonitrile, polyimine, polyimide, polybenzoxazole, polybenzimidazole, and polyamide are preferable, more preferably, at least one selected from polyethersulfone, polysulfone, polyketone, and polybenzimidazole are included as primary components, more preferably, at least one selected from polysulfone and polyethersulfone are included as primary components, and polyethersulfone is further preferable. Note that "primary component" means a component having the largest mass ratio in the entirety, and in one aspect, a component having a mass ratio of more than 50% by mass in the entirety.

When the microporous support membrane is composed of hollow fibers, the diameters of the hollow fibers are not particularly limited, but considering the stability of membrane formation, ease of handling, and the membrane area when formed into a module, an outer diameter of 100 μm to 3,000 μm and an inner diameter of 30 μm to 2,500 μm are preferable, and an outer diameter of 200 μm to 1,500 μm and an inner diameter of 50 μm to 1,000 μm are further preferable.

Such microporous support membranes, for example, microporous hollow fiber support membranes, can be produced by a known dry/wet film forming method, melt film forming method, or wet film forming method using a material selected from the above materials.

The forward osmosis membrane of the present embodiment can be used as a membrane module comprising a plurality of membranes (forward osmosis membrane module). Though the shape of the membrane module is not particularly limited, in general, a compartment in which the liquid is in contact with only one surface side of the membrane and a compartment in which the liquid is in contact with only the other surface side of the membrane are separated by an adhesive resin that affixes the membrane to the module housing. Taking a hollow fiber membrane as an example, a compartment in which the liquid is in contact with only the inner surface side of the membrane and a compartment in which the liquid is in contact only with the outer surface side of the membrane are present. The size of the module housing is not particularly specified, but for example, a cylindrical housing having a diameter of 0.5 inches to 20 inches and a length of 4 cm to 10 m can be used. Further, the module can be produced by using an adhesive such as urethane-based or epoxy-based as the adhesive resin.

The hollow fiber membrane module 1 (forward osmosis membrane module) shown in FIG. 1 has a structure in which a cylindrical body is filled with a fiber bundle composed of a plurality of hollow fibers 4, and the ends of the hollow-fiber fiber bundle are affixed to the cylindrical body with adhesive affixation parts 5, 6. The cylindrical body has outer conduits 2, 3 on the side surfaces thereof, which are sealed by headers 7, 8. The adhesive affixation parts 5, 6 are solidified so as to not occlude the holes of the hollow fibers. The headers 7, 8 have inner conduits 9, 10 which communicate with the insides (hollow portions) of the hollow fibers 4 and which do not communicate with the outside. These conduits allow liquid to be introduced or discharged into or from the interior of the hollow fibers 4. The outer conduits 2, 3 communicate with the outside of the hollow fibers 4 and do not communicate with the interiors of the hollow fibers 4.

The hollow fiber membrane module 1 has a structure in which the liquid flowing inside and the liquid flowing outside are in contact with each other only via the hollow fibers 4 (forward osmosis membrane).

In the present embodiment, the "effective surface area of the membrane" represents the area (i.e., the area of the forward osmosis membrane in which the raw material liquid or draw solution contacts) in which the raw material liquid and the draw solution are present via the forward osmosis membrane during the forward osmosis treatment.

For example, in the case of hollow fibers, the effective surface area (inner surface area of the hollow fiber membrane) of the membrane is defined by the following formula (3) from the length, inner diameter, and number of hollow fibers excluding the adhesive portions in the module.

$$A = c \times \pi \times b \times n \quad (3)$$

In formula (3), a is the inner surface area of the hollow fiber membrane ($m^2$), b is the length of the hollow fibers excluding the adhesive portion (m), c is the inner diameter of the hollow fibers (m), and n is the number of hollow fibers.

The thickness of the polymer thin film is preferably as thin as possible without the formation of pinholes. However, in order to maintain mechanical strength and chemical resistance, it is desirable to have an appropriate thickness. Thus, in consideration of film formation stability and water permeability, the thickness of the polymer thin film is preferably 0.1 μm to 3 μm, and more preferably 0.2 μm to 2 μm.

In the present embodiment, it is preferable that the coefficient of variation, which is the variation in the average thickness of the separation active layer, be within a specific range. Below, in the hollow fiber membrane module, which is a preferable example of the forward osmosis membrane module, the case in which the variation of the average thickness of the separation active layer at each location in the module of the hollow fiber is expressed by the coefficient of variation will be described. In the present disclosure, the coefficient of variation is a value obtained by dividing the standard deviation of the average thickness value of each measurement point by the average value between the measurement points of the average thickness, and is expressed as a percentage (%).

In one aspect, the coefficient of variation of the average thickness of the separation active layer, which is determined from a scanning electron microscope image obtained by photographing a thickness direction cross-section of the separation active layer (more specifically, is determined by a method of measuring the mass of a microscope image output by the method described in the "Examples" of the present disclosure), from the viewpoint of enabling the elimination of partial functional defects in production, is preferably 0 to 60%, more preferably 0 to 50%, further preferably 0 to 40%, and most preferably 0 to 30% in each of the radial and longitudinal directions of the hollow-fiber fiber bundle.

More specifically, the coefficient of variation is obtained by the following procedure. One hollow fiber is sampled from each of the three locations, the center in the radial direction of the module, the position at 50% of the radius, and the outermost circumference. For each of the nine sample measurement points obtained by dividing each of these hollow fibers into three equal parts in the length direction, the thickness of the separation active layer is measured when the number of n is 1 or more (the number of n at each location is the same), and the average value of the numbers at the nine locations is calculated.

The thickness at each measurement point is obtained as an average thickness in a measurement range having a length of approximately 5 to 100 μm. The length of this measuring range is preferably 5 to 50 μm, more preferably 5 to 20 μm, and most preferably 13 μm. The separation active layer in the hollow fiber membrane module of the present embodiment preferably has a fine concave/convex shape on the surface thereof, as will be described later. Thus, when evaluating the thickness of the separation active layer, it is appropriate to evaluate by the average thickness of the measurement range at each measurement point.

Furthermore, the coefficient of variation of the average thickness at each measurement point from the outermost peripheral part to the central part in the radial direction of the hollow fiber membrane module and the coefficient of variation from one end to the other end in the length direction of the module are each preferably 0 to 60%, more preferably 0 to 50%, further preferably 0 to 40%, and most preferably 0 to 30%.

A preferred separation active layer of the hollow fiber membrane module of the present embodiment as described above has a small variation in the average thickness measured at a plurality of measurement points. The length direction of the measurement range in the evaluation of the average thickness may be the length direction of the hollow fibers, the circumferential direction of the hollow fibers, or a direction oblique to the length direction of the hollow fibers. Further, the directions of the lengths of the measurement ranges in the plurality of scanning electron microscope images used for calculating the average value between the measurement points may be the same direction or different directions from each other.

The present inventors infer the mechanism by which the surface of the separation active layer of the hollow fiber membrane module of the present embodiment has a fine concave/convex shape as follows. However, the present embodiment is not bound by the following theory.

The separation active layer of this embodiment is preferably formed by interfacial polymerization. In interfacial polymerization, when the liquid film of the first monomer solution formed on the hollow fiber surface comes into contact with the second monomer solution, it is considered that the two do not dissolve in each other and polymerization proceeds at the interface to form a polymerized layer. As a result, it is considered that the formed separation active layer has a shape with many fine concavities and protrusions on the surface thereof. If the separation active layer is formed by a method other than interfacial polymerization, a separation active layer having a shape with many fine concavities and protrusions on the surface thereof is not formed.

Furthermore, a preferred method of producing the forward osmosis membrane of the present embodiment is promotion of a cross-linking reaction by heat treatment, which is described later. In order for the effect of this heat treatment to be uniform throughout, it is preferable that the average thickness coefficient of variation of the separation active layer be small, as described above.

The separation active layer of the polymer of the present embodiment is a membrane having substantial separation performance, which preferentially allows the solvent to pass through and blocks the solute. As such a separation active layer, for example, polyamide, polyvinyl alcohol/polypiperazine amide, sulfonated polyether sulfone, polypiperazine amide, and polyimide are preferably used.

In the present embodiment, polyamide is particularly preferably used in terms of ease of forming a defect-free thin film on the microporous support membrane. Furthermore, the forward osmosis membrane of the present embodiment is more preferably composed of hollow fibers, and is preferably present on the inner surface of the hollow fibers in order to prevent the separation active layer from being physically damaged.

The polymer is preferably a polycondensation product of one or more first monomers selected from the group consisting of polyfunctional amines and one or more second monomers selected from the group consisting of polyfunctional acid halides. More specifically, for example, the above-mentioned polyamide obtained by an interfacial polycondensation reaction between a polyfunctional amine and a polyfunctional acid halide is suitable. The separation performance when these polymers are used as the separation active layer refers to the performance of separating the solvent and the solutes in the liquid mixture such as ions dissolved in the solvent.

Examples of polyfunctional amines include polyfunctional aromatic amines, polyfunctional aliphatic amines, monomers having a plurality of reactive amino groups, and prepolymers thereof.

Polyfunctional aromatic amines are aromatic amino compounds having two or more amino groups in one molecule, and specific examples thereof include m-phenylenediamine, p-phenylenediamine, 3,3'-diaminodiphenylmethane, 4,4'-diaminodiphenylamine, 3,3'-diaminodiphenyl ether, 4,4'-diaminodiphenyl ether, 3,3'-diaminodiphenylamine, 3,5-diaminobenzoic acid, 4,4'-diaminodiphenyl sulfone, 3,3'-diaminodiphenyl sulfone, 3,4-diaminodiphenyl sulfone, 1,3,5-triaminobenzene, and 1,5-diaminonaphthalene. These may be used alone or as mixtures thereof. In the present embodiment, it is preferable that one or more selected from m-phenylenediamine and p-phenylenediamine be used.

Polyfunctional aliphatic amines are aliphatic amino compounds having two or more amino groups in one molecule, and specific examples thereof include:

primary amines with a cyclohexane ring such as 1,3-diaminocyclohexane, 1,4-diaminocyclohexane, 4,4'-bis(paraaminocyclohexyl) methane, 1,3-bis-(aminomethyl) cyclohexane, 2,4-bis-(aminomethyl) cyclohexane, and 1,3,5-triaminocyclohexane;

secondary amines with a piperazine ring such as piperazine, 2-methylpiperazine, ethylpiperazine, and 2,5-dimethylpiperazine;

secondary amines with a piperidine ring such as 1,3-bis (4-piperidyl) methane, 1,3-bis (4-piperidyl) propane, and 4,4'-bipiperidine;

amines with both primary and secondary amino groups such as 4-(aminomethyl) piperidine; as well as ethylenediamine, propylenediamine, 1,2-propanediamine, 1,2-diamino-2-methylpropane, 2,2'-dimethyl-1,3-propanediamine, tris (2-aminoethyl) amine, N, N'-dimethylethylenediamine, and N, N'-dimethylpropanediamine.

These may be used alone or in mixtures thereof. Mixtures of these polyfunctional aliphatic amines and the polyfunctional aromatic amines described above can also be used.

Examples of monomers having a plurality of reactive amino groups include polyethyleneimine, amine-modified polyepichlorohydrin, and amination polystyrene. As the prepolymer, for example, a prepolymer consisting of one or more selected from piperazine, 4-(aminomethyl) piperidine, ethylenediamine, and 1,2-diamino-2-methylpropane is preferably used.

Examples of polyfunctional halides include polyfunctional aromatic acid halides and polyfunctional aliphatic acid halides. These may be bifunctional or higher so that they can react with polyfunctional amines to form polymers.

Polyfunctional aromatic acid halides are aromatic acid halide compounds having two or more acid halide groups in one molecule. Specific examples thereof include trimesic acid halides, trimellitic acid halides, isophthalic acid halides, terephthalic acid halides, pyromellitic acid halides, benzophenone tetracarboxylic acid halides, biphenyldicarboxylic acid halides, naphthalene dicarboxylic acid halides, pyridinedicarboxylic acid halides, and benzenedisulfonic acid halides, and these may be used alone or mixtures thereof can be used. In the present embodiment, in particular, trimesic acid chloride alone, a mixture of trimesic acid chloride and isophthalic acid chloride, or a mixture of trimesic acid chloride and terephthalic acid chloride is preferably used.

Polyfunctional aliphatic acid halides are aliphatic acid halide compounds having two or more acid halide groups in one molecule. Specific examples thereof include alicyclic polyfunctional acid halide compounds such as cyclobutane dicarboxylic acid halides, cyclopentane dicarboxylic acid halides, cyclopentane tricarboxylic acid halides, cyclopentane tetracarboxylic acid halides, cyclohexanedicarboxylic acid halides, and cyclohexanetricarboxylic acid halides; as well as propanetricarboxylic acid halides, butanetricarboxylic acid halides, pentanetricarboxylic acid halides, succinic acid halides, and glutarate halides. These can be used alone or mixtures thereof can be used, and mixtures of these polyfunctional aliphatic acid halides and the polyfunctional aromatic acid halides described above can also be used.

The first monomer and the second monomer as described above are subjected to polymerization as solutions in which they are dissolved in an appropriate solvent.

An example of a preferred method for generating the polymer thin film in the present embodiment includes a method in which a first solution containing a monomer which contacts the microporous support membrane first and a second solution containing a monomer which contacts the support membrane after contact with the first solution and reacts with the monomer in the first solution to form a polymer are circulated in two stages. One of the first monomer and the second monomer will be contained in the first solution, and the other will be contained in the second solution. Either monomer may be contained in either solution, but it is not preferable that both monomers be contained in one solution.

The solvent of the first solution and the solvent of the second solution are not particularly limited as long as they are capable of dissolving the monomers contained therein, form a liquid-liquid interface when the two solutions come into contact with each other, and do not damage the microporous support membrane. As such solvents, for example, examples of the solvent of the first solution include water and alcohol alone or a mixture thereof, and examples of the solvent of the second solution include hydrocarbon solvents such as n-hexane, cyclohexane, n-heptane, n-octane, n-nonane, and n-decane alone or a mixture thereof. By selecting the solvents as described above, the first solution and the second solution become immiscible, the polymerization condensation reaction (interfacial polymerization reaction) proceeds, and a thin film of polymer is obtained. It is preferable to select the first monomer as the monomer contained in the first solution, and it is preferable to select the second monomer as the monomer contained in the second solution. The concentrations of the reactive compounds contained in the first solution and the second solution vary depending on the type of monomer, the partition coefficient with respect to the solvent, etc., are not particularly limited, and can appropriately be set by a person skilled in the art.

For example, the interfacial polymerization reaction when an m-phenylenediamine aqueous solution is used as the first solution and an n-hexane solution of trimesic acid chloride is used as the second solution is as follows.

The concentration of m-phenylenediamine is preferably 0.1 to 10% by mass, and more preferably 0.5 to 5% by mass. The concentration of trimesic acid chloride is preferably 0.01 to 10% by mass, and more preferably 0.1 to 5% by mass. If the concentration of these solutions is excessively low, the formation of a thin film by interfacial polymerization is incomplete and defects are likely to occur, resulting in deterioration of separation performance. Conversely, if it is excessively high, the formed thin film becomes excessively thick, which may reduce water permeability and increase the amounts of unreacted substances remaining in the film, which may adversely affect film performance.

In the case in which an acid is generated during the interfacial polymerization reaction, an alkali as an acid scavenger can be added to the first solution or the second solution. Furthermore, a surfactant for improving the wettability with the microporous support membrane, a reaction-promoting catalysts, and a salt as a film-forming improving agent may be added as necessary.

Examples of acid scavengers include caustic alkalis such as sodium hydroxide; sodium phosphates such as trisodium phosphate; sodium carbonates such as sodium carbonate; and tertiary amines such as trimethylamine, triethylamine, and triethylenediamine. Examples of surfactants include sodium lauryl sulfate and sodium laurylbenzene sulfonate. Examples of catalysts include dimethylformamide. Examples of film-forming improving agents include mixtures of trialkylamines such as triethylamine and organic acids such as camphorsulfonic acid. These can be contained in the first solution or the second solution in advance.

Further, in the present embodiment, by adjusting the higher-order structure of the polymer thin film and increasing the crosslink density, since physical durability and solvent resistance can be obtained and the salt reverse diffusion amount can be reduced, it is particularly preferable to promote the cross-linking reaction (curing) by heat treatment after thin film formation. More specifically, by heat-treating the forward osmosis membrane in an appropriate manner, the entirety of the separation active layer can be heated uniformly and in a relatively short time, whereby a forward osmosis membrane with reduced partial functional defects can be formed.

In the method of producing a forward osmosis membrane module of the present embodiment, it is preferable that the microporous support membrane be composed of hollow fibers, and after providing a separation active layer on the inner surface of the support membrane, a heat-treatment step be performed in a wet state.

More specifically, the method of producing a forward osmosis membrane module according to one aspect is a production method in which the microporous support membrane is composed of hollow fibers and a separation active layer is provided on the inner surface of the support membrane, and the coefficient of variation of the average thickness of the separation active layer in the radial direction and the length direction of the hollow-fiber fiber bundle, calculated by a method (more specifically, the method for measuring the mass of a microscope image output by the method described in the "Examples" of the present disclosure) of measuring the amount of the separation active layer portion in the scanning electron microscope image obtained by photographing a thickness-direction cross-section of the separation active layer, is 0 to 60%. In one aspect, in the method for producing a forward osmosis membrane module, after the provision of the separation active layer, a heat-treatment step in which a fluid (for example, a liquid or gas) having a temperature of 55° C. or higher is provided in a fluid state and a wet state is carried out on at least the separation active layer forming side (for example, when the separation active layer is provided on the inner surface of the support membrane, at least the inner surface side of the hollow fiber) of the support membrane.

Examples of the heat treatment method include the permeation of a moist gas (for example, nitrogen or air containing water) heated via a heat source, the permeation of hot water, and the permeation or exposure of a water vapor. "Permeation" as used herein means a process in which the fluid is supplied to the forward osmosis membrane and the separation active layer and the microporous support membrane come into contact with the fluid. An example of a preferred method of permeation includes a method in which, in the case of a hollow fiber-like forward osmosis membrane, by providing fluid inside or outside the hollow fiber or on both sides thereof, the fluid is brought into contact with the front side, the back side, and the inside of the separation active layer, as well as the pores of the microporous support membrane.

The heat treatment in the "heat-treatment step" of the present embodiment means a treatment at a temperature of at least 55° C. Furthermore, the "fluid state" of the present embodiment means a state in which the substance itself is moving in a solid, liquid, or gas.

The heat-treatment step of the present embodiment is more effective when the separation active layer of the forward osmosis membrane has a uniform thickness. "Uniform thickness" refers to a state in which the coefficient of variation of the average thickness of the separation active layer is 0 to 60%. The coefficient of variation is more preferably 0 to 50%, further preferably 0 to 40%, and most preferably 0 to 30%.

In the present embodiment, a method of applying hot water at a temperature of 60° C. to 100° C. to the forward osmosis membrane after formation of the polymer thin film is preferable. In particular, a method in which the forward osmosis membrane is composed of hollow fibers, and hot water at a temperature of 70° C. to 95° C. is provided on the inner surface side of the hollow fiber, which is the polymer thin film forming side, i.e., a method in which hot water at a temperature of 70° C. to 95° C. is continuously flowed (more specifically, permeated) to at least the inner surface side of the hollow fibers of the forward osmosis membrane, in which the separation active layer of the polymer is provided on the inner surface of the microporous hollow fiber support membrane, is preferably used because it promotes the cross-linking reaction of the polymer thin film and promotes high heat transfer efficiency. When the flow (for example, permeation) of hot water is continued, heat is transferred uniformly to the separation active layer as compared to the method of immersing the separation active layer in hot water, and residual monomers in the support membrane flow, which is particularly preferable because unnecessary reactions are less likely to occur. The water flow time of hot water is preferably 5 minutes to 2 hours. When this time is 5 minutes or more, the cross-linking reaction proceeds satisfactorily. Furthermore, when this time exceeds 2 hours, the effect at the corresponding temperature reaches equilibrium, and thus, this time is preferably 2 hours or less.

In another example of the present embodiment, a method of applying high-temperature water vapor to the forward osmosis membrane is also preferably used. "High-temperature water vapor" refers to water in a gaseous state at 100° C. or higher, and in particular, under high-pressure conditions. The high temperature water vapor can be generated in a pressure vessel such as an autoclave generally used for high-pressure steam sterilization. In the promotion of the cross-linking reaction of the polymer of the forward osmosis membrane, for example, a method in which a water vapor at a temperature of 100° C. to 170° C. is applied to the forward osmosis membrane, in which the polymer thin film separation active layer is provided on the inner surface of a microporous hollow fiber support membrane, and in particular, a method of providing water vapor at 100° C. to 150° C. is preferably used because it promotes the cross-linking reaction of the polymer thin film well, the support membrane or the polymer thin film is not significantly damaged, and the salt reverse diffusion is extremely low. The time for applying the water vapor to the forward osmosis membrane at the set temperature is preferably 1 minute to 2 hours. If this time is 1 minute or more, the cross-linking reaction proceeds satisfactorily. Further, if this time exceeds 2 hours, the effect at the corresponding temperature reaches equilibrium, and thus, this time is preferably 2 hours or less.

Further, when applying the heat treatment in the above wet state to a three-dimensional polymer thin film formed from the first monomer and the second monomer, at least one of which contains a reactive compound having three or more reactive groups, the above effects are more pronounced, and as a result, the strength and durability of the forward osmosis membrane are improved, and the salt reverse diffusion is reduced, which is particularly preferable.

The term "purified water" as used in the present disclosure refers to water having an electric conductivity of 100 µS/cm or less and an organic substance concentration of 10 mass ppm or less, and the purified water can be produced by a distillation method, an ion exchange method, or a reverse osmosis method.

EXAMPLES

The present invention will be specifically described below based on the Examples, but the present invention is not limited by the Examples.

Example 1

[Microporous Support Membrane Production]

A polyether sulfone (PES; manufactured by BASF, product name Ultrason) and a terminally hydroxylated polyether sulfone were dissolved in N-methyl-2-pyrrolidone (manufactured by Wako Pure Chemical Industries, Ltd.) to prepare a hollow fiber spinning stock solution having a polymer concentration of 18.5% by mass.

At this time, the ratio of the polyether sulfone to the terminally hydroxylated polyether sulfone was 55:45. A wet hollow fiber spinning machine equipped with a double spinner was filled with the above stock solution and extrusion was performed into a coagulation tank filled with water to form hollow fibers by phase separation. The obtained hollow fibers were wound on a winder. The outer diameters of the obtained hollow fibers were 1.0 mm, and the inner diameters were 0.70 mm. The water permeation performance was 2,392 kg/(m²×hr)/100 kPa. The hollow fibers were used as a microporous hollow fiber support membrane.

[Support Membrane Module Production]

1750 microporous hollow fiber support membranes were filled in a cylindrical plastic housing having a diameter of 5 cm and a length of 50 cm to prepare a support membrane module as shown in FIG. 1 having an effective membrane inner surface area of 1.65 m².

[Separation Active Layer Application]

An aqueous solution (first solution) containing 2.0% by mass of m-phenylenediamine and 0.15% by mass of sodium lauryl sulfate was passed through the inner surface side of the hollow fibers of the support membrane module for 40 minutes. Thereafter, the liquid was drained, the outer part of the support membrane module was maintained under reduced pressure at 90 kPaG in a state in which the interiors of the hollow fibers were wetted with the first solution, and air was then flowed at a flow rate of 100 L/min for 10 minutes to remove the excess first solution. Thereafter, an n-hexane solution (second solution) containing 0.17% by mass of 1,3,5-trimesic acid chloride was passed through the module for 3 minutes at a flow rate of 1.75 L/min whereby a separation active layer was applied to the inner surface of the hollow fibers by the interfacial polymerization method. Thereafter, the excess n-hexane solution was removed by flowing nitrogen gas, hot water at a temperature of 70° C. was then flowed inside the hollow fibers at a flow rate of 1.5 L/min for 30 minutes, and the module was then washed with water at a temperature of 20° C. for 30 minutes or more to obtain a forward osmosis membrane module.

[Measurement of Water Permeation performance F1 of Forward Osmosis Membrane Module, and Salt Reverse Diffusion Amount R1]

A 100 L tank containing 60 L of purified water was connected to the inner conduit (interiors of the hollow fibers) of the obtained forward osmosis membrane module by piping, and purified water (raw material liquid) was circulated with a pump. The tank was equipped with a conductivity meter to measure the movement of salt into the purified water. A 100 L tank containing 3.5% by mass sodium chloride aqueous solution 60 L was connected to the outer conduit (exteriors of the hollow fibers) by piping, and a sodium chloride aqueous solution (draw solution) was circulated with a pump. The inner and outer tanks were placed on a balance, and the amount of water movement was measured. The purified water and the sodium chloride aqueous solution were circulated at the same time at the flow rates of 2.2 L/min and 8.8 L/min, respectively, and the amount of water and salt transferred after 60 minutes was measured. The draw solution to be diluted was set to maintain the initial concentration by adding a saturated draw solution incrementally during measurement, and measurement was carried out at 25° C. These were performed at least five times, and the average values thereof were used to calculate the water permeability F1 and salt reverse diffusion amount R1 of the forward osmosis membrane by formulas (1) and (2).

$$R = G/(M \times H) \tag{1}$$

In formula 1, G is the amount of solute permeated from the draw solution side to the raw material liquid side (g), M is the effective surface area of the forward osmosis membrane (m²) and H is the time (hr).

$$F = L/(M \times H) \tag{2}$$

In formula 2, L is the amount of water permeated from the raw material liquid side to the draw solution side (kg), M is the effective surface area of the forward osmosis membrane (m²), and H is the time (hr).

The results are shown in Table 1.

[Measurement of Salt Permeability R2/F2 of Forward Osmosis Membrane Module]

A 100 L tank containing 60 L of a 20% by mass sodium chloride aqueous solution was connected to the inner conduit of the obtained forward osmosis membrane module by piping, and a sodium chloride aqueous solution (raw material liquid 2 in the table) was circulated with a pump. A 100 L tank containing 60 L of a 35% by mass magnesium chloride aqueous solution was connected to the outer conduit with piping, and a magnesium chloride aqueous solution (draw solution 2 in the table) was circulated with a pump. The inner and outer tanks were placed on a balance, and the amount of water movement was measured. The sodium chloride aqueous solution and the magnesium chloride aqueous solution were circulated at the same time at the flow rates of 2.2 L/min and 8.8 L/min, respectively, and the amount of water and salt transferred after 60 minutes was measured. The draw solution to be diluted was set to maintain the initial concentration by adding a saturated draw solution incrementally during measurement, and the measurement was carried out at 25° C. To calculate the amount of salt transfer, the amount of cations ($Mg^{2+}$ ions derived from magnesium chloride, which is the solute of the draw solution) was measured using an inductively coupled plasma-mass spectrometry (ICP-MS) device manufactured by Thermo Fisher Scientific, type "iCAP Q." These were performed at least five times, and using the average value thereof, the water permeability F2 and salt reverse diffusion amount R2 of the forward osmosis membrane were calculated by formulas (1) and (2), and R2 is divided by F2 to calculate the salt permeability R2/F2. The results are shown in Table 1.

[Scanning Electron Microscopy of Separation Active Layer, Average Thickness, and Coefficient of Variation Measurement]

The forward osmosis membrane module obtained in each Example and Comparative Example was disassembled, and one hollow fiber was sampled from each of the three locations of the radial center of the module, the position of 50% of the radius, and the outermost periphery. Each hollow fiber was divided into three equal parts in the length direction to obtain nine samples. Each of these hollow fiber samples was frozen and split to prepare a hollow fiber cross-section sample.

The samples were prepared by freezing and splitting as follows.

The hollow fibers were immersed in ethanol (manufactured by Wako Pure Chemical Industries, Ltd.), encapsulated in a No. 00 gelatin capsule (manufactured by Wako Pure Chemical Industries, Ltd.), and were thereafter immersed in liquefied nitrogen for 5 minutes and frozen. The hollow fibers in the frozen capsules were cut with a chisel and a mallet. Then, the obtained cut pieces were freeze-dried to obtain a hollow fiber cross-sectional sample for observation with a scanning electron microscope. Scanning electron microscope observation was performed on each of the above cross-sectional samples. The scanning electron microscopic observation was carried out using a model S-4800 manufactured by Hitachi, Ltd. under the conditions of an acceleration voltage of 1.0 kV, a WD of 5 mm reference ±0.7 mm, and an emission current setting of 10±1 μA. The microscope image was printed on paper with a printer, the separation active layer part was cut out, and the mass was measured with a precision balance. This mass was converted into a thickness (μm) of the separation active layer by a calibration curve prepared in advance. Then, the coefficient of variation was calculated by using the average value of the nine samples as the average thickness of the separation active layer. The results are shown in Table 1.

[Concentration of Simulated Sap]

Magnesium chloride was added to a 10% by mass sucrose aqueous solution and diluted so that the $Mg^{2+}$ ion concentration in the solution was 40 mass ppm to prepare a simulated sap (raw material liquid). A 1000 L tank containing 300 L of this raw material liquid was connected to the inner conduit of the forward osmosis membrane module obtained by the same manufacturing method by piping, and the simulated sap was circulated with a pump. A 1000 L tank containing 500 L of a 20% by mass magnesium chloride aqueous solution was connected to the outer conduit by piping, and a magnesium chloride aqueous solution (draw solution) was circulated with a pump. The inner and outer tanks were graduated in advance so that the amount of internal liquid could be calculated from the liquid level, and the amount of water movement was measured from the transition of the liquid level in the raw material liquid tank. The amount of water transferred from the raw material liquid to the draw solution was calculated, and when concentration had proceeded approximately five times (when the raw material liquid reached 60 L), the operation was stopped and the transfer amounts of water and salt were measured. The draw solution to be diluted was set to maintain the initial concentration by adding a saturated draw solution incrementally during measurement, and the measurement was carried out at 25° C. To calculate the amount of salt transfer, the amount of cations ($Mg^{2+}$ ions derived from the magnesium chloride, which is the solute of the draw solution) was measured using an inductively-coupled plasma-mass spectrometry (ICP-MS) device manufactured by Thermo Fisher Scientific, type "iCAP Q."

[Evaluation of Mg Concentration After Simulated Sap Concentration: Practicality]

After concentration of the simulated sap, the obtained forward osmosis membrane module was washed with water for 5 hours or more, simulated sap was concentrated again in the same manner, and the simulated sap was five-fold concentrated five times.

As a measure of practicality, after concentrating the simulated sap five times, the $Mg^{2+}$ ion concentration diffused from the draw solution into the raw material liquid was evaluated according to the following criteria AA to C. The results are shown in Table 1.

AA: When the $Mg^{2+}$ ion concentration in the concentrated raw material liquid was less than 500 mass ppm A: When the $Mg^{2+}$ ion concentration in the concentrated raw material liquid was 500 mass ppm or more and less than 1500 mass ppm B: When the $Mg^{2+}$ ion concentration in the concentrated raw material liquid was 1500 mass ppm or more and less than 2500 mass ppm C: When the $Mg^{2+}$ ion concentration in the concentrated raw material liquid was 2500 mass ppm or more When the ideal concentration proceeded and the draw solution did not diffuse into the raw material liquid, the $Mg^{2+}$ ion concentration will be 200 mass ppm.

[R1/F1 Evaluation After 20 Repetitions of Simulated Sap Concentration: Durability]

After concentration of the simulated sap, the obtained forward osmosis membrane module was washed with water for 5 hours or more, simulated sap was concentrated again in the same manner, and five-fold concentration of the simulated sap was repeated 20 times. As a measure of durability, after the twentieth concentration, the forward osmosis membrane module was washed with water, and R1/F1 was then calculated again by the same method as in Example 1 and evaluation was carried out according to the following criteria A to C. The results are shown in Table 1.

A: When R1/F1 is 0.15 or less

B: When R1/F1 exceeds 0.15 and is 0.25 or less

C: When R1/F1 exceeds 0.25

Example 2

Evaluation was carried out under the same conditions as in Example 1 except that the separation active layer was applied as follows.

An aqueous solution (first solution) containing 2.0% by mass of m-phenylenediamine and 0.15% by mass of sodium lauryl sulfate was passed through the inner surface side of the hollow fibers of the support membrane module for 40 minutes. Thereafter, the liquid was drained, the outer part of the support membrane module was maintained under reduced pressure at 90 kPaG in a state in which the interiors of the hollow fibers were wetted with the first solution, and air was flowed at a flow rate of 100 L/min for 10 minutes to remove the excess first solution. Thereafter, an n-hexane solution (second solution) containing 0.13% by mass of 1,3,5-trimesic acid chloride was passed through the module for 3 minutes at a flow rate of 1.75 L/min whereby a separation active layer was applied to the inner surface of the hollow fibers by the interfacial polymerization method. Thereafter, the excess n-hexane solution was removed by flowing nitrogen gas, hot water at a temperature of 85° C. was then flowed in the interiors of the hollow fibers for 30 minutes, and the module was then washed with water at a temperature of 20° C. for 30 minutes or more to obtain a forward osmosis membrane module. The results are shown in Table 1.

Example 3

Evaluation was carried out under the same conditions as in Example 1 except that the separation active layer was applied as follows.

An aqueous solution (first solution) containing 2.0% by mass of m-phenylenediamine and 0.15% by mass of sodium lauryl sulfate was passed through the inner surface side of the hollow fibers of the support membrane module for 40 minutes. Thereafter, the liquid was drained, the outer part of the support membrane module was maintained under reduced pressure at 90 kPaG in a state in which the interiors of the hollow fibers were wetted with the first solution, and air was then flowed at a flow rate of 100 L/min for 10 minutes to remove the excess first solution. Thereafter, an n-hexane solution (second solution) containing 0.15% by mass of 1,3,5-trimesic acid chloride was passed through the module for 3 minutes at a flow rate of 1.75 L/min whereby a separation active layer was applied to the inner surface of the hollow fibers by the interfacial polymerization method.

Thereafter, the excess n-hexane solution was removed by flowing nitrogen gas, hot water at a temperature of 95° C. was then flowed inside the hollow fibers for 30 minutes, and the module was then washed with water at a temperature of 20° C. for 30 minutes or more to obtain a forward osmosis membrane module. The results are shown in Table 1.

Example 4

Evaluation was carried out under the same conditions as in Example 1 except that the separation active layer was applied as follows.

An aqueous solution (first solution) containing 2.0% by mass of m-phenylenediamine and 0.15% by mass of sodium lauryl sulfate was passed through the inner surface side of the hollow fibers of the support membrane module for 40 minutes. Thereafter, the liquid was drained, the outer part of the support membrane module was maintained under reduced pressure at 90 kPaG in a state in which the interiors of the hollow fibers were wetted with the first solution, and air was then flowed at a flow rate of 100 L/min for 10 minutes to remove the excess first solution. Thereafter, an n-hexane solution (second solution) containing 0.20% by mass of 1,3,5-trimesic acid chloride was passed through the module for 3 minutes at a flow rate of 1.75 L/min whereby a separation active layer was applied to the inner surface of the hollow fibers by the interfacial polymerization method. Thereafter, the excess n-hexane solution was removed by flowing nitrogen gas, hot water at a temperature of 70° C. was then flowed inside the hollow fibers for 30 minutes, and the module was then placed in an autoclave (ES-315, manufactured by Tomy Seiko Co., Ltd.) and subjected to high-temperature water vapor at a temperature of 100° C. for 20 minutes. The module was then washed with water at a temperature of 20° C. for 30 minutes or more to obtain a forward osmosis membrane module. The results are shown in Table 1.

Example 5

Evaluation was carried out under the same conditions as in Example 1 except that the separation active layer was applied as follows.

An aqueous solution (first solution) containing 2.0% by mass of m-phenylenediamine and 0.15% by mass of sodium lauryl sulfate was passed through the inner surface side of the hollow fibers of the support membrane module for 40 minutes. Thereafter, the liquid was drained, the outer part of the support membrane module was maintained under reduced pressure at 90 kPaG in a state in which the interiors of the hollow fibers were wetted with the first solution, and air was then flowed at a flow rate of 100 L/min for 10 minutes to remove the excess first solution. Thereafter, an n-hexane solution (second solution) containing 0.13% by mass of 1,3,5-trimesic acid chloride was passed through the module for 3 minutes at a flow rate of 1.75 L/min whereby a separation active layer was applied to the inner surface of the hollow fibers by the interfacial polymerization method. Thereafter, the excess n-hexane solution was removed by flowing nitrogen gas, and the module was then placed in an autoclave (ES-315, manufactured by Tomy Seiko Co., Ltd.) and subjected to high-temperature water vapor at a temperature of 121° C. for 20 minutes. The module was then washed with water at a temperature of 20° C. for 30 minutes or more to obtain a forward osmosis membrane module. The results are shown in Table 1.

Example 6

Evaluation was carried out under the same conditions as in Example 1 except that the separation active layer was applied as follows.

An aqueous solution (first solution) containing 2.0% by mass of m-phenylenediamine and 0.15% by mass of sodium lauryl sulfate was passed through the inner surface side of the hollow fibers of the support membrane module for 40 minutes. Thereafter, the liquid was drained, the outer part of the support membrane module was maintained under reduced pressure at 90 kPaG in a state in which the interiors of the hollow fibers were wetted with the first solution, and air was then flowed at a flow rate of 100 L/min for 10 minutes to remove the excess first solution. Thereafter, an n-hexane solution (second solution) containing 0.20% by mass of 1,3,5-trimesic acid chloride was passed through the module for 3 minutes at a flow rate of 1.75 L/min whereby a separation active layer was applied to the inner surface of the hollow fibers by the interfacial polymerization method. Thereafter, the excess n-hexane solution was removed by flowing nitrogen gas, hot water at a temperature of 70° C. was then flowed inside the hollow fibers for 30 minutes, and the module was then placed in an autoclave (ES-315, manufactured by Tomy Seiko Co., Ltd.) and subjected to high-temperature water vapor at a temperature of 132° C. for 20 minutes. The module was then washed with water at a temperature of 20° C. for 30 minutes or more to obtain a forward osmosis membrane module. The results are shown in Table 1.

Example 7

Evaluation was carried out under the same conditions as in Example 4 except that the microporous support membrane was composed of polyketone hollow fibers. The polyketone hollow fiber membrane module was prepared as follows.

A polyketone having an intrinsic viscosity of 3.0 dl/g, in which ethylene and carbon monoxide are completely alternately copolymerized, was added to a 63% by mass resorcin aqueous solution at a polymer concentration of 17% by mass, and the mixture was stirred to carry out dissolution at 80° C. for 2 hours to defoam. As a result, a uniform and transparent undiluted solution was obtained.

A wet hollow fiber spinning machine equipped with a double spinner was filled with the above undiluted solution at 50° C. and extrusion was carried out into a coagulation tank filled with a 40% by mass aqueous methanol solution to form hollow fibers by phase separation. The obtained hollow fibers were wound on a winder. The outer diameters of the obtained hollow fibers were 0.6 mm, and the inner diameters were 0.35 mm. 3500 of the obtained microporous hollow fiber support membranes were filled in a cylindrical plastic housing having a diameter of 5 cm and a length of 50 cm to prepare a support membrane module as shown in FIG. 1 having an effective membrane inner surface area of 1.65 m$^2$. The results are shown in Table 1.

Example 8

The evaluation was carried out under the same conditions as in Example 4 except that the microporous support membrane was composed of polybenzimidazole hollow fibers. The polybenzimidazole hollow fiber membrane module was prepared as follows.

A polybenzimidazole (PBI; manufactured by Performance Products) was dissolved in DMAc (manufactured by Wako Pure Chemical Industries, Ltd.) and 1.4% by mass of LiCl to prepare a hollow fiber spinning stock solution having a polymer concentration of 18% by mass. A wet hollow fiber spinning machine equipped with a double spinner was filled with the above stock solution and extrusion was carried out into a coagulation tank filled with water to form hollow fibers by phase separation. The obtained hollow fibers were wound on a winder. The outer diameters of the obtained hollow fibers were 0.5 mm, and the inner diameters were 0.35 mm. The hollow fibers were used as a support membrane. 3500 of the obtained microporous hollow fiber support membranes were filled in a cylindrical plastic housing having a diameter of 5 cm and a length of 50 cm to prepare a support membrane module as shown in FIG. 1 having an effective membrane inner surface area of 1.65 m². The results are shown in Table 1.

Example 9

Evaluation was carried out under the same conditions as in Example 4 except that the microporous support membrane was composed of polysulfone hollow fibers. The polysulfone hollow fiber membrane module was prepared as follows.

A polysulfone (P-3500 manufactured by Amoco Co., Ltd.) was dissolved in N-methyl-2-pyrrolidone (manufactured by Wako Pure Chemical Industries, Ltd.) so as to achieve a content of 19% by mass to prepare a hollow fiber spinning stock solution. A wet hollow fiber spinning machine equipped with a double spinner was filled with the above stock solution and extrusion was carried out into a coagulation tank filled with water to form hollow fibers by phase separation. The obtained hollow fibers were wound on a winder. The outer diameters of the obtained hollow fibers were 1.0 mm, and the inner diameters were 0.70 mm. The hollow fibers were used as a microporous hollow fiber support membrane. 1750 of the obtained microporous hollow fiber support membranes were filled in a cylindrical plastic housing having a diameter of 5 cm and a length of 50 cm to prepare a support membrane module as shown in FIG. 1 having an effective membrane inner surface area of 1.65 m². The results are shown in Table 1.

Example 10

Evaluation was carried out under the same conditions as Example 4 except that in the measurement of the salt permeability R2/F2 of the forward osmosis membrane module, the raw material liquid 2 in the table was a 10% by mass sodium chloride aqueous solution and the draw solution 2 in the table was a 20% by mass magnesium chloride aqueous solution. The results are shown in Table 1.

Example 11

Evaluation was carried out under the same conditions as Example 4 except that in the measurement of the salt permeability R2/F2 of the forward osmosis membrane module, the raw material liquid 2 in the table was a 15% by mass potassium chloride aqueous solution, and the draw solution 2 in the table was a 35% by mass magnesium chloride aqueous solution. The results are shown in Table 1.

Example 12

Evaluation was carried out under the same conditions as Example 4 except that in the measurement of the salt permeability R2/F2 of the forward osmosis membrane module, the raw material liquid 2 in the table was a 15% by mass sucrose (sucrose) aqueous solution, and the draw solution 2 in the table was a 15% by mass magnesium chloride aqueous solution. The results are shown in Table 1.

Example 13

Evaluation was carried out under the same conditions as Example 4 except that in the measurement of the salt permeability R2/F2 of the forward osmosis membrane module, the raw material liquid 2 in the table was a 15% by mass sucrose aqueous solution, and the draw solution 2 in the table was a 15% by mass sodium chloride aqueous solution. The results are shown in Table 1.

Example 14

Evaluation was carried out under the same conditions as Example 4 except that in the measurement of the salt permeability R2/F2 of the forward osmosis membrane module, the raw material liquid 2 in the table was purified water, and the draw solution 2 in the table was a 35% by mass magnesium chloride aqueous solution. The results are shown in Table 1.

Comparative Example 1

Evaluation was carried out under the same conditions as Example 1 except that the separation active layer was applied as follows.

An aqueous solution (first solution) containing 2.0% by mass of m-phenylenediamine and 0.15% by mass of sodium lauryl sulfate was passed through the inner surface side of the hollow fibers of the support membrane module for 40 minutes. Thereafter, the liquid was drained, the outer part of the support membrane module was maintained under reduced pressure at 90 kPaG in a state in which the interiors of the hollow fibers were wetted with the first solution, and air was then flowed at a flow rate of 100 L/min for 10 minutes to remove the excess first solution. Thereafter, an n-hexane solution (second solution) containing 0.13% by mass of 1,3,5-trimesic acid chloride was passed through the module for 3 minutes at a flow rate of 1.75 L/min whereby a separation active layer was applied to the inner surface of the hollow fibers by the interfacial polymerization method. Thereafter, the excess n-hexane solution was removed by flowing nitrogen gas, and the module was then washed with water at a temperature of 20° C. for 30 minutes or more to obtain a forward osmosis membrane module. The results are shown in Table 1.

Comparative Example 2

Evaluation was carried out under the same conditions as in Example 1 except that the separation active layer was applied as follows.

An aqueous solution (first solution) containing 2.0% by mass of m-phenylenediamine and 0.15% by mass of sodium lauryl sulfate was passed through the inner surface side of the hollow fibers of the support membrane module for 40 minutes. Thereafter, the liquid was drained, the outer part of the support membrane module was maintained under reduced pressure at 90 kPaG in a state in which the interiors of the hollow fibers were wetted with the first solution, and air was then flowed at a flow rate of 100 L/min for 10 minutes to remove the excess first solution. Thereafter, an n-hexane solution (second solution) containing 0.20% by mass of 1,3,5-trimesic acid chloride was passed through the module for 3 minutes at a flow rate of 1.75 L/min whereby a separation active layer was applied to the inner surface of the hollow fibers by the interfacial polymerization method. Thereafter, the excess n-hexane solution was removed by flowing nitrogen gas, dry nitrogen having a dew point of −55° C., which was heated to 50° C., was flowed through the module for 30 minutes, and the module was then washed with water at a temperature of 20° C. for 30 minutes or more to obtain a forward osmosis membrane module. The results are shown in Table 1.

Comparative Example 3

Evaluation was carried out under the same conditions as in Example 1 except that the separation active layer was applied as follows.

An aqueous solution (first solution) containing 2.0% by mass of m-phenylenediamine and 0.15% by mass of sodium lauryl sulfate was passed through the inner surface side of the hollow fibers of the support membrane module for 40 minutes. Thereafter, the liquid was drained, the outer part of the support membrane module was maintained under reduced pressure at 90 kPaG in a state in which the interiors of the hollow fibers were wetted with the first solution, and air was then flowed at a flow rate of 100 L/min for 10 minutes to remove the excess first solution. Thereafter, an n-hexane solution (second solution) containing 0.15% by mass of 1,3,5-trimesic acid chloride was passed through the module for 3 minutes at a flow rate of 1.75 L/min whereby a separation active layer was applied to the inner surface of the hollow fibers by the interfacial polymerization method. Thereafter, the excess n-hexane solution was removed by flowing nitrogen gas, dry nitrogen having a dew point of −55° C., which was heated to 80° C., was flowed through the module for 2 hours, and the module was then washed with water at a temperature of 20° C. for 30 minutes or more to obtain a forward osmosis membrane module. The results are shown in Table 1.

Comparative Example 4

Evaluation was carried out under the same conditions as in Example 1 except that the separation active layer was applied as follows.

An aqueous solution (first solution) containing 2.0% by mass of m-phenylenediamine and 0.15% by mass of sodium lauryl sulfate was passed through the inner surface side of the hollow fibers of the support membrane module for 40 minutes. Thereafter, the liquid was drained, the outer part of the support membrane module was maintained under reduced pressure at 90 kPaG in a state in which the interiors of the hollow fibers were wetted with the first solution, and air was then flowed at a flow rate of 100 L/min for 10 minutes to remove the excess first solution. Thereafter, an n-hexane solution (second solution) containing 0.14% by mass of 1,3,5-trimesic acid chloride was passed through the module for 3 minutes at a flow rate of 1.75 L/min whereby a separation active layer was applied to the inner surface of the hollow fibers by the interfacial polymerization method. Thereafter, the excess n-hexane solution was removed by flowing nitrogen gas, dry nitrogen having a dew point of −55° C., which was heated to 100° C., was flowed through the module for 30 minutes, and the module was then washed with water at a temperature of 20° C. for 30 minutes or more to obtain a forward osmosis membrane module. The results are shown in Table 1.

Comparative Example 5

Evaluation was carried out under the same conditions as Example 1 except that the separation active layer was applied as follows.

An aqueous solution (first solution) containing 2.0% by mass of m-phenylenediamine and 0.15% by mass of sodium lauryl sulfate was passed through the inner surface side of the hollow fibers of the support membrane module for 40 minutes. Thereafter, the liquid was drained, the outer part of the support membrane module was maintained under reduced pressure at 90 kPaG in a state in which the interiors of the hollow fibers were wetted with the first solution, and air was then flowed at a flow rate of 100 L/min for 10 minutes to remove the excess first solution. Thereafter, an n-hexane solution (second solution) containing 0.15% by mass of 1,3,5-trimesic acid chloride was passed through the module for 3 minutes at a flow rate of 1.75 L/min whereby a separation active layer was applied to the inner surface of the hollow fibers by the interfacial polymerization method. Thereafter, the excess n-hexane solution was removed by flowing nitrogen gas, hot water at a temperature of 50° C. was then flowed inside the hollow fibers for 30 minutes, and the module was then washed with water at a temperature of 20° C. for 30 minutes or more to obtain a forward osmosis membrane module. The results are shown in Table 1.

Comparative Example 6

Evaluation was carried out under the same conditions as Example 1 except that the separation active layer was applied as follows.

An aqueous solution (first solution) containing 2.0% by mass of m-phenylenediamine and 0.15% by mass of sodium lauryl sulfate was passed through the inner surface side of the hollow fibers of the support membrane module for 40 minutes. Thereafter, the liquid was drained, the outer part of the support membrane module was maintained under reduced pressure at 5 kPaG in a state in which the interiors of the hollow fibers were wetted with the first solution, and air was then flowed at a flow rate of 100 L/min for 1 hour to remove the excess first solution. Thereafter, an n-hexane solution (second solution) containing 0.20% by mass of 1,3,5-trimesic acid chloride was passed through the module for 3 minutes at a flow rate of 1.75 L/min whereby a separation active layer was applied to the inner surface of the hollow fibers by the interfacial polymerization method. Thereafter, the excess n-hexane solution was removed by flowing nitrogen gas, hot water at a temperature of 85° C. was then flowed inside the hollow fibers for 30 minutes, and the module was then washed with water at a temperature of 20° C. for 30 minutes or more to obtain a forward osmosis membrane module. The results are shown in Table 1.

Comparative Example 7

Evaluation was carried out under the same conditions as Example 1 except that the separation active layer was applied as follows.

An aqueous solution (first solution) containing 2.0% by mass of m-phenylenediamine and 0.15% by mass of sodium lauryl sulfate was passed through the inner surface side of the hollow fibers of the support membrane module for 40 minutes. Thereafter, the liquid was drained, the outer part of the support membrane module was maintained under reduced pressure at 5 kPaG in a state in which the interiors of the hollow fibers were wetted with the first solution, and air was then flowed at a flow rate of 100 L/min for 10 minutes to remove the excess first solution. Thereafter, an n-hexane solution (second solution) containing 0.15% by mass of 1,3,5-trimesic acid chloride was passed through the module for 3 minutes at a flow rate of 1.75 L/min whereby a separation active layer was applied to the inner surface of the hollow fibers by the interfacial polymerization method. Thereafter, the excess n-hexane solution was removed by flowing nitrogen gas, the hollow fiber membrane module was then immersed in hot water at a temperature of 95° C. for 30 minutes, and the module was then washed with water at a temperature of 20° C. for 30 minutes or more to obtain a forward osmosis membrane module. The results are shown in Table 1.

Comparative Example 8

An aqueous solution containing 2.2% by mass of m-phenylenediamine, 0.10% by mass of sodium lauryl sulfate, 2.2% by mass of triethylamine, and 4.4% by mass of camphorsulfonic acid was brought into contact with a flat membrane-like support membrane composed of a polysulfone porous body and a non-woven fabric. The excess solution was then removed. The surface of the support membrane was brought into contact with an n-hexane solution containing 0.19% by mass of 1,3,5-trimesic acid chloride for 3 minutes. Thereafter, the module was maintained in a dryer at 120° C. for 5 minutes, whereby a separation active layer was formed on the support membrane to obtain a composite reverse osmosis membrane. Further, the composite reverse osmosis membrane was immersed in hot water at a temperature of 85° C. for 30 minutes. A 1.6 m² reverse osmosis membrane module was prepared using a flat membrane cell. With reference to Example 1, the flow rate was set so that the linear velocity was the same as that of Example 1, and the other items were evaluated under the same conditions. At this time, treatment was carried out by the forward osmosis method by providing the raw material liquid on the separation active layer side and the draw solution on the support membrane side. The results are shown in Table 1.

Since Comparative Example 8 uses a flat membrane, the column of coefficient of variation regarding the average thickness of the hollow fibers is indicated by "-" (not evaluated) in the table.

Comparative Example 9

Evaluation was carried out under the same conditions as Comparative Example 4 except that in the measurement of the salt permeability R2/F2 of the forward osmosis membrane module, the raw material liquid 2 in the table was a 15% by mass sucrose (sucrose) aqueous solution, and the draw solution 2 in the table was a 15% by mass magnesium chloride aqueous solution. The results are shown in Table 1.

Comparative Example 10

Evaluation was carried out under the same conditions as Comparative Example 1 except that in the measurement of the salt permeability R2/F2 of the forward osmosis membrane module, the raw material liquid 2 in the table was a 15% by mass sucrose (sucrose) aqueous solution, and the draw solution 2 in the table was a 15% by mass sodium chloride aqueous solution. The results are shown in Table 1.

Comparative Example 11

Evaluation was carried out under the same conditions as Comparative Example 1 except that in the measurement of the salt permeability R2/F2 of the forward osmosis membrane module, the raw material liquid 2 in the table was purified water, and the draw solution 2 in the table was a 35% by mass magnesium chloride aqueous solution. The results are shown in Table 1.

Comparative Example 12

An aqueous solution containing 2.0% by mass of m-phenylenediamine and 0.10% by mass of sodium lauryl sulfate was brought into contact with a flat membrane-like support membrane composed of a porous body of acetylated cellulose ether and a non-woven fabric. The excess solution was then removed. The surface of the support membrane was brought into contact with an n-hexane solution containing 0.20% by mass of 1,3,5-trimesic acid chloride for 3 minutes. Thereafter, the module was maintained in a dryer at 120° C. for 5 minutes, whereby a separation active layer was formed on the support membrane to obtain a composite membrane. A 1.0 m² membrane module was prepared using a flat membrane cell and evaluated in the same manner as in Comparative Example 8. At this time, treatment was carried out by the forward osmosis method by providing the raw material liquid on the separation active layer side and the draw solution on the support membrane side. The results are shown in Table 1.

Since Comparative Example 12 uses a flat membrane, the column of coefficient of variation regarding the average thickness of the hollow fibers is indicated by "-" (not evaluated) in the table.

Comparative Example 13

Cellulose triacetate, N-methyl-2-pyrrolidone, ethylene glycol, and benzoic acid were uniformly dissolved to prepare a hollow fiber spinning stock solution. A spinning machine equipped with a three-part nozzle was filled with the above stock solution and extrusion was carried out into a water tank containing N-methyl-2-pyrrolidone to form hollow fibers by phase separation. The obtained hollow fibers were wound on a winder. The outer diameters of the obtained hollow fibers were 0.15 mm, and the inner diameters were 0.07 mm. The hollow fibers were bundled to form a membrane module, and the flow rate was set so that the pressures applied to the inside and outside of the hollow fibers were the same as those of Example 1, with reference to Example 1, and the other values were evaluated under the same conditions. At this time, treatment by the forward osmosis method was carried out by providing the raw material liquid on the dense layer side located on the outer peripheral portion of the hollow fibers and the draw solution on the inside of the hollow fibers.

Since Comparative Example 13 uses an asymmetric membrane which is composed of a signal substance, i.e., is not a composite membrane, the column of coefficient of variation regarding the average thickness of the hollow fibers is indicated by "-" (not evaluated) in the table.

Comparative Example 15

Evaluation was carried out under the same conditions as Example 5 except that the microporous support membrane was composed of polysulfone hollow fibers. The polysulfone hollow fiber membrane module was prepared in the same manner as in Example 9.

Example 16

Evaluation was carried out under the same conditions as Example 6 except that the microporous support membrane was composed of polysulfone hollow fibers. The polysulfone hollow fiber membrane module was prepared in the same manner as in Example 9.

Example 17

Evaluation was carried out under the same conditions as in Example 9 except that the separation active layer was applied as follows.

An aqueous solution (first solution) containing 2.5% by mass of m-phenylenediamine and 0.10% by mass of sodium lauryl sulfate was passed through the inner surface side of the hollow fibers of the support membrane module for 30 minutes. Thereafter, the liquid was drained, the outer part of the support membrane module was maintained under reduced pressure at 90 kPaG in a state in which the interiors of the hollow fibers were wetted with the first solution, and air was then flowed at a flow rate of 70 L/min for 3 minutes to remove the excess first solution. Thereafter, an n-hexane solution (second solution) containing 0.18% by mass of 1,3,5-trimesic acid chloride was passed through the module for 10 minutes at a flow rate of 1.5 L/min whereby a separation active layer was applied to the inner surface of the hollow fibers by the interfacial polymerization method. Thereafter, the excess n-hexane solution was removed by flowing nitrogen gas, hot water at a temperature of 85° C. was then flowed inside the hollow fibers for 30 minutes, and the module was then placed in an autoclave (ES-315, manufactured by Tomy Seiko Co., Ltd.) and subjected to high-temperature water vapor at a temperature of 125° C. for 60 minutes. The module was then washed with water at a temperature of 20° C. for 30 minutes or more to obtain a forward osmosis membrane module. The results are shown in Table 1.

Example 18

Evaluation was carried out under the same conditions as in Example 9 except that the separation active layer was applied as follows.

An aqueous solution (first solution) containing 2.0% by mass of m-phenylenediamine and 0.17% by mass of sodium lauryl sulfate was passed through the inner surface side of the hollow fibers of the support membrane module for 20 minutes. Thereafter, the liquid was drained, the outer part of the support membrane module was maintained under reduced pressure at 90 kPaG in a state in which the interiors of the hollow fibers were wetted with the first solution, and air was then flowed at a flow rate of 110 L/min for 2 minutes to remove the excess first solution. Thereafter, an n-hexane solution (second solution) containing 0.21% by mass of 1,3,5-trimesic acid chloride was passed through the module for 2 minutes at a flow rate of 1.9 L/min whereby a separation active layer was applied to the inner surface of the hollow fibers by the interfacial polymerization method. Thereafter, the excess n-hexane solution was removed by flowing nitrogen gas, hot water at a temperature of 85° C. was then flowed inside the hollow fibers for 30 minutes, and the module was then placed in an autoclave (ES-315, manufactured by Tomy Seiko Co., Ltd.) and subjected to high-temperature water vapor at a temperature of 121° C. for 20 minutes. The module was then washed with water at a temperature of 20° C. for 24 hours or more to obtain a forward osmosis membrane module. The results are shown in Table 1.

In each of the forward osmosis membrane modules, the membrane performance R1/F1 after concentration of the simulated sap multiple times changed from the initial R1/F1. Conversely, by maintaining the initial F1 and R1 within the predetermined ranges, in the concentration of raw material liquid, which is close to the liquid used in the actual concentration operation, such as simulated sap, the forward osmosis membrane module of the present embodiment was highly practical because concentration with suppressed diffusion of the draw solution could be carried out even if it was used multiple times.

Further, from the comparison of the membrane performance R1/F1 after the concentration operation, the forward osmosis membrane module according to one aspect of the present invention can maintain membrane performance within the desired range even when used multiple times, and has high durability.

Furthermore, as one of the methods for producing such a forward osmosis membrane, it was particularly effective to bring a wet and high temperature liquid or gas into contact with each other in a fluid state.

TABLE 1

| | Water permeability F1 [kg/(m² × hr)] | Salt Reverse Diffusion Amount R1 [g/(m² × hr)] | Salt Permeability R1/F1 | Hollow Fiber Average Thickness Coefficient of Variation [%] | Support Membrane | Raw Material Liquid 2 | Draw Solution 2 | Salt Permeability R2/F2 | Practicality | Durability |
|---|---|---|---|---|---|---|---|---|---|---|
| Ex 1 | 11.0 | 0.63 | 0.06 | 37 | PES | 20 wt % NaCl aqueous solution | 35 wt % MgCl$_2$ aqueous solution | 0.66 | A | B |
| Ex 2 | 9.5 | 0.42 | 0.04 | 36 | PES | 20 wt % NaCl aqueous solution | 35 wt % MgCl$_2$ aqueous solution | 0.55 | A | A |
| Ex 3 | 8.6 | 0.38 | 0.04 | 35 | PES | 20 wt % NaCl aqueous solution | 35 wt % MgCl$_2$ aqueous solution | 0.53 | A | A |
| Ex 4 | 8.4 | 0.29 | 0.03 | 32 | PES | 20 wt % NaCl aqueous solution | 35 wt % MgCl$_2$ aqueous solution | 0.43 | AA | A |
| Ex 5 | 7.8 | 0.12 | 0.02 | 31 | PES | 20 wt % NaCl aqueous solution | 35 wt % MgCl$_2$ aqueous solution | 0.35 | AA | A |
| Ex 6 | 6.5 | 0.09 | 0.01 | 31 | PES | 20 wt % NaCl aqueous solution | 35 wt % MgCl$_2$ aqueous solution | 0.27 | AA | A |
| Ex 7 | 9.0 | 0.34 | 0.04 | 38 | Polyketone | 20 wt % NaCl aqueous solution | 35 wt % MgCl$_2$ aqueous solution | 0.44 | A | A |

TABLE 1-continued

| | Water permeability F1 [kg/(m²×hr)] | Salt Reverse Diffusion Amount R1 [g/(m²×hr)] | Salt Permeability R1/F1 | Hollow Fiber Average Thickness Coefficient of Variation [%] | Support Membrane | Raw Material Liquid 2 | Draw Solution 2 | Salt Permeability R2/F2 | Practicality | Durability |
|---|---|---|---|---|---|---|---|---|---|---|
| Ex 8 | 5.2 | 0.29 | 0.06 | 42 | Polybenzimidazole | 20 wt % NaCl aqueous solution | 35 wt % MgCl₂ aqueous solution | 0.45 | A | A |
| Ex 9 | 6.5 | 0.27 | 0.04 | 39 | Polysulfone | 20 wt % NaCl aqueous solution | 35 wt % MgCl₂ aqueous solution | 0.42 | AA | A |
| Comp Ex 1 | 12.5 | 1.23 | 0.10 | 41 | PES | 20 wt % NaCl aqueous solution | 35 wt % MgCl₂ aqueous solution | 1.69 | C | C |
| Comp Ex 2 | 12.3 | 1.34 | 0.11 | 43 | PES | 20 wt % NaCl aqueous solution | 35 wt % MgCl₂ aqueous solution | 1.73 | C | C |
| Comp Ex 3 | 12.0 | 1.32 | 0.11 | 39 | PES | 20 wt % NaCl aqueous solution | 35 wt % MgCl₂ aqueous solution | 1.68 | C | C |
| Comp Ex 4 | 11.0 | 1.29 | 0.12 | 39 | PES | 20 wt % NaCl aqueous solution | 35 wt % MgCl₂ aqueous solution | 1.67 | C | C |
| Comp Ex 5 | 11.4 | 1.30 | 0.11 | 43 | PES | 20 wt % NaCl aqueous solution | 35 wt % MgCl₂ aqueous solution | 1.70 | C | C |
| Comp Ex 6 | 10.7 | 2.98 | 0.28 | 71 | PES | 20 wt % NaCl aqueous solution | 35 wt % MgCl₂ aqueous solution | 6.36 | C | C |
| Comp Ex 7 | 10.1 | 0.98 | 0.10 | 48 | PES | 20 wt % NaCl aqueous solution | 35 wt % MgCl₂ aqueous solution | 1.07 | C | C |
| Comp Ex 8 | 1.5 | 0.16 | 0.11 | — (flat membrane) | Polysulfone | 20 wt % NaCl aqueous solution | 35 wt % MgCl₂ aqueous solution | 4.72 | C | C |
| Ex 10 | 8.0 | 0.27 | 0.03 | 32 | PES | 10 wt % NaCl aqueous solution | 20 wt % MgCl₂ aqueous solution | 0.32 | AA | A |
| Ex 11 | 8.3 | 0.28 | 0.03 | 33 | PES | 15 wt % KCl aqueous solution | 35 wt % MgCl₂ aqueous solution | 0.37 | AA | A |
| Ex 12 | 8.4 | 0.29 | 0.03 | 31 | PES | 15 wt % sucrose aqueous solution | 15 wt % MgCl₂ aqueous solution | 0.09 | AA | A |
| Comp Ex 9 | 11.0 | 1.29 | 0.12 | 42 | PES | 15 wt % sucrose aqueous solution | 15 wt % MgCl₂ aqueous solution | 0.80 | C | C |
| Ex 13 | 8.4 | 0.29 | 0.03 | 32 | PES | 15 wt % sucrose aqueous solution | 15 wt % NaCl aqueous solution | 0.60 | AA | A |
| Comp Ex 10 | 12.5 | 1.23 | 0.10 | 41 | PES | 15 wt % sucrose aqueous solution | 15 wt % NaCl aqueous solution | 3.40 | C | C |
| Ex 14 | 8.1 | 0.28 | 0.03 | 32 | PES | purified water | 35 wt % MgCl₂ aqueous solution | 0.002 | AA | A |
| Comp Ex 11 | 12.5 | 1.23 | 0.10 | 41 | PES | purified water | 35 wt % MgCl₂ aqueous solution | 0.023 | C | C |
| Comp Ex 12 | 2.8 | 0.23 | 0.08 | — (flat membrane) | Acetylated Cellulose Ether | 20 wt % NaCl aqueous solution | 35 wt % MgCl₂ aqueous solution | 1.47 | B | C |
| Comp Ex 13 | 6.4 | 0.90 | 0.14 | — (asymmetric membrane) | Cellulose Triacetate | 20 wt % NaCl aqueous solution | 35 wt % MgCl₂ aqueous solution | 2.78 | — | — |
| Ex 15 | 6.5 | 0.18 | 0.03 | 32 | Polysulfone | 20 wt % NaCl aqueous solution | 35 wt % MgCl₂ aqueous solution | 0.35 | AA | A |
| Ex 16 | 6.0 | 0.10 | 0.02 | 31 | Polysulfone | 20 wt % NaCl aqueous solution | 35 wt % MgCl₂ aqueous solution | 0.30 | AA | A |
| Ex 17 | 4.0 | 0.27 | 0.07 | 41 | Polysulfone | 20 wt % NaCl aqueous solution | 35 wt % MgCl₂ aqueous solution | 0.59 | A | B |
| Ex 18 | 5.1 | 0.30 | 0.06 | 35 | Polysulfone | 20 wt % NaCl aqueous solution | 35 wt % MgCl₂ aqueous solution | 0.50 | A | A |

DESCRIPTION OF REFERENCE SIGNS

1 hollow fiber membrane module
2 outer conduit
3 outer conduit
4 hollow fiber
5 adhesive affixation part
6 adhesive affixation part
7 header
8 header
9 inner conduit
10 inner conduit

The invention claimed is:

1. A forward osmosis membrane in which a separation active layer of a polymer is provided on a surface of a microporous support membrane, wherein
when purified water is arranged as a raw material liquid on the separation active layer side and 3.5% by mass of a sodium chloride aqueous solution is arranged as a draw solution on the microporous support membrane side via the forward osmosis membrane, a salt reverse diffusion amount R1 into the raw material liquid is 0.65 g/(m²×hr) or less, and a water permeability F1 into the draw solution is 3.5 kg/(m²×hr) or more.

2. The forward osmosis membrane according to claim 1, wherein the salt reverse diffusion amount R1 into the raw material liquid is 0.45 g/(m²×hr) or less.

3. The forward osmosis membrane according to claim 1, wherein the salt reverse diffusion amount R1 into the raw material liquid is 0.30 g/(m²×hr) or less.

4. The forward osmosis membrane according to claim 1, wherein the water permeability F1 into the draw solution is 6.0 kg/(m²×hr) or more.

5. The forward osmosis membrane according to claim 2, wherein the water permeability F1 into the draw solution is 6.0 kg/(m²×hr) or more.

6. The forward osmosis membrane according to claim 4, wherein the salt reverse diffusion amount R1 into the raw material liquid is 0.30 g/(m²×hr) or less.

7. The forward osmosis membrane according to claim 1, wherein the microporous support membrane comprises a membrane having, as primary components, at least one selected from the group consisting of polyethersulfone, polysulfone, polyketone, polyetheretherketone, polyphenylene ether, polyvinylidene fluoride, polyacrylonitrile, polyimine, polyimide, polybenzoxazole, polybenzimidazole, and polyamide.

8. The forward osmosis membrane according to claim 1, wherein the microporous support membrane is a membrane comprising, as primary components, at least one selected from the group consisting of polyethersulfone, polysulfone, polyketone, and polybenzimidazole.

9. The forward osmosis membrane according to claim 1, wherein the microporous support membrane is a membrane comprising, as primary components, at least one selected from the group consisting of polyethersulfone and polysulfone.

10. The forward osmosis membrane according to claim 1, wherein the polymer is a polycondensation product of one or more first monomers selected from the group consisting of polyfunctional amines and one or more second monomers selected from the group consisting of polyfunctional acid halides.

11. The forward osmosis membrane according to claim 10, wherein the polymer is a polyamide.

12. The forward osmosis membrane according to claim 1, wherein the forward osmosis membrane is a hollow fiber.

13. The forward osmosis membrane according to claim 12, wherein the separation active layer is present on an inner surface of the microporous support membrane.

14. A forward osmosis membrane module in which the forward osmosis membrane according to claim 1 is incorporated.

15. The forward osmosis membrane module according to claim 14, wherein the forward osmosis membrane is a hollow fiber and the forward osmosis membrane module comprises a hollow-fiber fiber bundle constituted by a plurality of the hollow fibers.

16. The forward osmosis membrane module according to claim 15, wherein in a scanning electron microscope image in which a thickness direction cross-section of the separation active layer is captured, an average thickness coefficient of variation of the separation active layer in the radial direction and longitudinal direction of the hollow-fiber fiber bundle is 0 to 60%.

17. A method of producing the forward osmosis membrane module according to claim 15, comprising:
    a separation active layer formation step wherein a separation active layer is provided on an inner surface of a microporous support membrane, and
    a heat-treatment step wherein, after the separation active layer formation step, a fluid of 55° C. or higher is supplied to at least the inner surface side of the hollow fibers in a fluid state and a wet state.

18. The method of producing a forward osmosis membrane module according to claim 17, wherein the heat treatment step is performed by continuously supplying 70° C. to 95° C. hot water to at least the inner surface side of the hollow fibers.

19. The method of producing a forward osmosis membrane module according to claim 17, wherein the heat-treatment step is performed by means of 100° C. to 150° C. water vapor.

20. A method of producing the forward osmosis membrane module according to claim 16, comprising:
    a separation active layer formation step wherein a separation active layer is provided on an inner surface of a microporous support membrane, and
    a heat-treatment step wherein, after the separation active layer formation step, a fluid of 55° C. or higher is supplied to at least the inner surface side of the hollow fibers in a fluid state and a wet state, wherein the heat-treatment step is performed by means of 100° C. to 150° C. water vapor.

* * * * *